US00RE46143E

(19) United States
(12) Reissued Patent
Erman et al.

(10) Patent Number: US RE46,143 E
(45) Date of Reissued Patent: Sep. 13, 2016

(54) CARTRIDGE BASED FLUID DISPENSING APPARATUS

(71) Applicant: A.C. DISPENSING EQUIPMENT INC., Lower Sackville (CA)

(72) Inventors: P. Gregory Erman, Head of Chezzetcook (CA); Chris Marshall, Stillwater Lake (CA); Avery Wilson, Middle Sackville (CA); David A. Ricker, Fall River (CA); Michael McDougall, Mt. Uniacke (CA); Kevin Stoneman, Lower Sackville (CA); Ian MacLean, Fall River (CA)

(73) Assignee: A.C. DISPENSING EQUIPMENT, INC., Lower Sackville (CA)

(21) Appl. No.: 14/887,829

(22) Filed: Oct. 20, 2015

Related U.S. Patent Documents

Reissue of:
(64) Patent No.: 8,561,841
Issued: Oct. 22, 2013
Appl. No.: 12/440,499
PCT Filed: Sep. 7, 2007
PCT No.: PCT/CA2007/001575
§ 371 (c)(1),
(2) Date: Mar. 9, 2009
PCT Pub. No.: WO2008/028294
PCT Pub. Date: Mar. 13, 2008

U.S. Applications:
(60) Provisional application No. 60/824,938, filed on Sep. 8, 2006.

(51) Int. Cl.
*B67D 1/00* (2006.01)
*A47J 31/40* (2006.01)

(Continued)

(52) U.S. Cl.
CPC ..... *A47J 31/402* (2013.01); *F04B 9/02* (2013.01); *F04B 13/00* (2013.01)

(58) Field of Classification Search
CPC ..... A47J 31/402; F04B 9/02; F04B 13/00
USPC ..... 222/63, 135, 137, 325, 326, 333, 386, 222/390
See application file for complete search history.

(56) References Cited

U.S. PATENT DOCUMENTS 3,854,629 A * 12/1974 Blieberger ..... 222/109
4,648,872 A * 3/1987 Kamen ..... 604/155

(Continued)

OTHER PUBLICATIONS

PCT Application No. PCT/CA2007/001575, Corrected International Search Report dated Dec. 21, 2007.

(Continued)

*Primary Examiner* — Joseph Kaufman
(74) *Attorney, Agent, or Firm* — Borden Ladner Gervais LLP; Shin Hung

(57) ABSTRACT

A concentrated flavor dispensing machine having displacement pumps for delivering between a fraction of a milliliter and a few ounces of fluids having a viscosity value between 1 to 4000 centepoise is described. The dispensing machine includes a cabinet for containing a multitude of displacement pumps, where each displacement pump is realizably connected to a disposable pre-filled fluid cartridge. Each displacement pump includes a stepper motor in engagement with a threaded drive rod that is advanced or retracted by any one of several predetermined distances. The drive rod impels a plunger positioned within the disposable cartridge to dispense a volume of fluid. Flexible capillary tubes connected to the output of each disposable cartridge direct the fluid to a central dispensing area. The disposable cartridge includes an expandable plunger which draws fluid back into the cartridge when the drive rod is withdrawn after a dispense operation for drip prevention.

34 Claims, 20 Drawing Sheets

(51) Int. Cl.
*F04B 9/02* (2006.01)
*F04B 13/00* (2006.01)

(56) References Cited

U.S. PATENT DOCUMENTS 5,027,984 A * 7/1991 Gakhar et al. ..... 222/326
5,219,099 A * 6/1993 Spence et al. ..... 222/325
5,279,569 A * 1/1994 Neer et al. ..... 604/154
5,314,415 A 5/1994 Liebert et al.
5,358,145 A * 10/1994 Smith et al. ..... 222/137
5,411,489 A 5/1995 Pagay et al.
5,558,251 A * 9/1996 Neri ..... B01F 13/1058 222/135
5,630,527 A 5/1997 Beebe et al.
5,746,357 A * 5/1998 Beveridge et al. ..... 222/386
6,003,736 A * 12/1999 Ljunggren ..... 222/309
6,050,450 A 4/2000 Gardos
6,056,165 A * 5/2000 Speranza ..... 222/333
6,268,000 B1 * 7/2001 Romer ..... 426/115
6,334,553 B1 * 1/2002 Bouras et al. ..... 222/386
6,520,381 B1 * 2/2003 Prestele ..... 222/137
6,854,620 B2 * 2/2005 Ramey ..... 222/63
6,926,177 B1 * 8/2005 Scott et al. ..... 222/390
6,957,747 B2 10/2005 Peeler et al.
6,981,618 B2 * 1/2006 Reisinger ..... 222/326
7,025,226 B2 * 4/2006 Ramey ..... 222/1
7,337,920 B2 * 3/2008 Duck et al. ..... 222/63
7,708,163 B2 * 5/2010 Argentine ..... 222/1
7,971,751 B2 * 7/2011 Argentine ..... 222/1
2005/0236429 A1 10/2005 Duck et al.
2006/0286262 A1 12/2006 Stearns et al.

OTHER PUBLICATIONS

CA Application No. 2,662,872, Notice of Allowance dated May 22, 2015.
CA Application No. 2,662,872, Office Action dated Aug. 25, 2014.
U.S. Appl. No. 12/440,499, Notice of Allowance dated Jul. 3, 2013.
U.S. Appl. No. 12/440,499, Office Action dated Mar. 1, 2012.
U.S. Appl. No. 12/440,499, Office Action dated Sep. 11, 2012.
U.S. Appl. No. 12/440,499, Office Action dated Dec. 31, 2012.
PCT Patent Application No. PCT/CA2007/001575, International Search Report dated Dec. 21, 2007.

* cited by examiner

CARTRIDGE BASED FLUID DISPENSING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of priority of U.S. Provisional Patent Application No. 60/824,938, filed on Sep. 8, 2006.

FIELD OF THE INVENTION

The present invention relates generally to liquid dispensing machines. More particularly, the present invention relates to liquid dispensing machines capable of dispensing small and accurate amounts of concentrated liquids.

BACKGROUND OF THE INVENTION

Many coffee shops and convenience stores serve an array of coffee products, from mild to strong coffees brewed from coffee beans grown in different areas of the world, each imparting a particular flavour and aroma. Due to the limited counter space available in these stores, only a small selection of coffees are served each day, as coffee pots, heat plates and coffee bean grinders occupy a significant portion of the counter space. This selection can include strong, mild or medium roast coffees brewed from a variety of coffee beans.

In addition to these "standard" coffees, a selection of flavoured coffees are also served. Examples of such flavours include amaretto almond, French Vanilla and Irish cream. One method of providing flavoured coffees is to obtain flavoured coffee beans with the flavouring infused into the beans, and grinding them for brewing a pot of the flavoured coffee. Another method is to use pre-packaged, ground flavoured coffee. A third method is to stock a selection of flavour syrups that can be directly added to any regular cup of coffee by the server. This technique provides more flexibility since the flavour can be added to any standard coffee.

However, because separate grinders are required for grinding standard coffee beans and flavoured coffee beans to ensure that the standard coffee bean grinders are free from contamination from flavoured grounds, valuable counter space is taken up and additional cost is incurred by the extra grinder. Furthermore, flavoured coffees tend to stew in their pots for a relatively long period of time since they may not be as popular as the non-flavoured coffees. Those of skill in the art are well aware that coffee left standing on a heat plate for too long is unpalatable due to poor taste. Therefore, additional cost is incurred, as unsold flavoured coffee must be thrown out in favour of freshly brewed flavoured coffee. Although use of pre-packaged flavoured coffee obviates the need for an additional grinder, the problem with limited counter space and aged coffee persists. Furthermore, the consumer perception that pre-packaged coffee cannot be as fresh as freshly ground coffee tends to curb consumers from purchasing pre-packaged, flavoured coffee.

Bottles of flavoured liquids, or syrups, are easily stored upon shelves and countertops, and a wide selection of flavours can be made available to the consumer. Unfortunately, consistency of flavour between different servings is difficult to achieve because the dose of syrup added to each cup of coffee is subject to human error. Furthermore, the optimal dose of syrup changes for different sized cups of coffee, and for different types of beverages (cappuccino, lattes, tea etc) to ensure that the flavouring is not overpowering or insufficient for the base beverage. Consistent dosing is further complicated when several flavours are added to the same beverage, as different flavours can overpower others. For example, mint flavouring can easily overpower a vanilla flavouring of the same quantity. Hence, consistent and accurate dosing of flavourings cannot be achieved when a server is responsible for manually preparing a flavoured beverage.

Another factor for consideration is the concentrated flavouring itself. Manufacturers and retailers prefer to use concentrated flavouring with minimal carrier, as the carrier can affect the flavouring and taste of the flavoured beverage, and the additional volume contributed by the carrier increases shipping costs of the flavouring. Thus, the highly concentrated flavouring to be added can be in the order of several milliliters, depending on the type and size of beverage. Due to the highly concentrated nature of the concentrated flavouring, accuracy of the dispense becomes critical since the absence or addition of a fraction of a milliliter can significantly affect the taste of the beverage.

Known dispensing machines include simple gravity fed valves, peristaltic pumps, pressurized systems and displacement pumps, for dispensing fluids. However, none of these types of machines are suitable for dispensing the very small volumes of concentrated flavouring fluid desired by the industry. Primarily, these types of machines are not suitable for dispensing small quantities of fluids of varying viscosity, particularly high viscosity syrups having centepoise values of close to 4000.

One novel dispensing system is disclosed in commonly owned U.S. patent application Ser. No. 10/830,033, filed on Apr. 23, 2004. The dispensing system includes a cabinet for containing a multitude of displacement pumps, where each displacement pump is in direct fluid communication with a respective storage tank, and a control panel having a programmable microprocessor mounted to the cabinet for receiving user selections and controlling each individual pump. Each displacement pump includes a stepper motor in engagement with a threaded drive rod for advancing a piston by any one of several predetermined distances to dispense a corresponding volume of fluid. The control panel receives a valid user selection for actuating one or more pumps to dispense the appropriate volume of a concentrated flavouring fluid. The microprocessor tracks the amount of fluid dispensed from each storage tank and alerts users and/or prevents further operation when reservoirs are close to empty to avoid null dispenses to customers.

Various maintenance routines can be executed through the user interface, and dispense volumes and combination dispenses can be re-programmed manually or automatically. Following is a description of the general components of this dispensing system, originally described in U.S. patent application Ser. No. 10/830,033.

The dispensing system of FIG. 1 is intended to be a commercial dispenser, for use in fast food restaurants, or similar retail environments. FIG. 1 is an isometric view of dispensing machine 100, with an array of pump assemblies positioned within cabinet 102, having a door panel 104. As shown in FIG. 1, there are flexible tubes located between nozzle cap 106 and each displacement pump.

FIG. 2 is a side view of one pump assembly 110 used in the system of FIG. 1 to illustrate the configuration of the displacement pump 112 and its corresponding storage tank 114. Storage tank 114 can be constructed of molded plastic material, metal, or any suitable liquid impermeable material, for storing concentrated flavouring fluid. The storage tank is preferably constructed of a rigid material. The tank is filled by removing tank cap 116 and pouring concentrated flavouring fluid into the open aperture (not shown). The stored concentrated flavouring fluid is provided to displacement pump 112 through a short tank nozzle in fluid communication with the storage tank 114 that extends from the bottom of storage tank 114 and into a check valve retainer 118. The short tank nozzle is preferably constructed of the same material as the storage tank 114, and preferably provided in the same die mold as the storage tank 114. Tank cap 116 preferably includes an O-ring and a one way check valve to allow entry of air into the volume of the storage tank 114 as concentrated fluid is drawn, but prevents vapours from escaping and potentially contaminating flavours stored in the other storage tanks 114.

FIG. 3 shows components of displacement pump 112, and in particular, details of the piston 130 and threaded drive rod 132. Piston 130 is fixed to a piston seal 134 made of Santoprene™ a type of thermoplastic elastomer available from Advanced Elastomer Systems or tetrafluoroethylene available from Dupont, where the piston seal 134 is dimensioned to sealingly engage the inner surface of cylinder tube chamber 136. Piston seal 134 has a wide contact edge, preferably a width to provide structural/mechanical stability of the edge under load. In the present embodiments, the width of piston seal 134 can be between 2 to 3.5 mm. However, the selection of the width can be based on the desired sealing surface, frictional wear, and force required to drive the piston seal 134. In contrast, a narrow contact edge can bow as the piston seal 134 is advanced, resulting in potential leakage of fluid into the space behind the piston seal 134. Due to the small volumes of fluid to be dispensed, small amounts of leakage can contribute to inaccurate dispenses. In addition to inaccurate dispenses, the aromatic impact of the leaked fluid is undesired, and reliability of the displacement pump may be affected. More specifically, the leaked fluid can come into contact with threaded drive rod 132, rod guide 138 and guide tube 140, which can affect their operation. Unfortunately, rebuild or replacement of the displacement pump is required for correcting this problem. Therefore, the relatively wide contact edge is selected to prevent any bowing of the contact edge during operation, and potential leakage of fluid from cylinder tube chamber 136.

An end of threaded drive rod 132 is fixed to a recess in piston 130 via spring pin 142 that extends through the walls of piston 130 and threaded drive rod 132. Also fixed to threaded drive rod 132 is a rod guide 138. Rod guide 138 slips over threaded drive rod 132 and is fixed by spring pin 144 which extends through the walls of rod guide 138 and threaded drive rod 132. The rod guide 138 is fixed to threaded drive rod 132 at a position such that it only travels within guide tube 140.

Additional components of displacement pump 112 include O-rings, such as O-ring 146 for sealing the interface between one way check valve 148 within cylinder front flange 150, check valve retainer 151, gasket face seal 152 for sealing the interface between cylinder tube chamber 136 and cylinder front flange 150, and nuts 154 and 156 for tightening threaded rods 158 and holding the displacement pump components together in a torqued compression, and a cylinder rear flange 157. Cylinder front flange 150 includes a passage for receiving check valve nozzle 159, for receiving a capillary tube.

Stepper motor 160 is a commercially available product having a face that mates with guide tube flange 162. Those of skill in the art will understand that stepper motor 160 includes a stator and a rotor that engages, rotates threaded drive rod 132 in a worm gear relationship to translate rotational movement of the rotor into linear motion of the threaded drive rod 132. Therefore, the threaded drive rod 132 is advanced or withdrawn depending on the clockwise or counter-clockwise rotation of the rotor. Stepper motor operation is well known to persons of skill in the art. Generally, the stepper motor rotates by predetermined step sizes in response to electrical input signals. Hence, the travel distance of a drive rod having a known thread pattern can easily be determined and controlled.

The aforementioned dispenser is typically operated and maintained by trained personnel, typically staff of a restaurant or service counter. While operation of the dispenser is straightforward, maintenance of the dispenser can be cumbersome. In particular, when the storage tank 114 runs empty, the user will need to pull out the displacement pump 112 containing the empty storage tank, and re-fill the tank from another container. Preferably, this is done without spillage during the transfer, which may be difficult during peak service periods when the re-fill must be done rapidly. Of course, any spillage should be cleaned up for hygiene purposes. Furthermore, the user may initiate pre-programmed clean and prime operations for the dispensing unit if a different flavouring is to be used for a displacement pump.

The aforementioned dispenser can be used in a self-serve environment. For example, customers purchasing a beverage in a convenience store can choose to add a desired flavouring by pushing the appropriate buttons on the user interface. This is convenient for the convenience store clerk who is typically alone and does not have time to service the client. However when it comes time to refill the tank, the clerk will not have sufficient training or time to properly refill the tank, resulting in spillage that is not typically cleaned. The relative complexity of refilling the tanks of the dispenser, and/or risk of spilling concentrated fluid, may deter convenience store clerks from maintaining the machine.

It is, therefore, desirable to provide a dispensing machine that provides a simple and rapid flavour refilling system while minimizing fluid spillage during a refill operation.

SUMMARY OF THE INVENTION

It is an object of the present invention to obviate or mitigate at least one disadvantage of previous fluid dispensing systems. In particular, it is an object of the invention to provide a dispensing machine that provides a simple and rapid flavour refilling system while minimizing fluid spillage during a refill operation.

In a first aspect, the present invention provides a pump unit for dispensing a predetermined volume of fluid. The pump unit includes a stepper motor, a cartridge mount, and a disposable cartridge. The stepper motor is in threaded engagement with a threaded drive rod, and is rotatable in one direction by a number of steps to advance the threaded drive rod. The cartridge mount is coupled to a stepper motor, and has a locking means with an aperture sized to pass the threaded drive rod. The a disposable cartridge has a first end adapted to engage the locking means for securing the disposable cartridge to the cartridge mount. The disposable cartridge has a chamber sealed with a plunger slidable in the chamber, and includes an outlet nozzle at a second end for dispensing contents of the chamber when the plunger is pushed by the threaded drive rod.

According to an embodiment of the present aspect, the plunger includes an expandable plunger top of resilient material deformable to an expanded state when the plunger is pushed by a piston connected to the threaded drive rod, such that the expandable plunger top returns to a relaxed state when the piston is withdrawn from the plunger. In further embodiments, the locking means includes a bayonet style twist lock, and the first end of the disposable cartridge is adapted for engaging the bayonet style twist lock, and a capillary tube is releasably connected to the outlet nozzle. In another embodiment of the present aspect, the pump unit includes a driver card in electrical communication with the stepper motor, the driver card including a microcontroller for controlling the stepper motor in response to pump control data. The driver card can include a connector for receiving the pump control data, and the cartridge mount can include a mounting means for securing the cartridge mount to a chassis.

In a second aspect, the present invention provides a dispensing machine for providing a predetermined volume of fluid corresponding to a user selection. The dispensing machine includes a pump unit having a stepper motor, a disposable cartridge, a user interface, and a microprocessor. The stepper motor advances a threaded drive rod in response to pump control data. The disposable cartridge is releasably connected to the pump unit, and has a plunger for engaging the threaded drive rod. The user interface provides electrical selection signals in response to the user selection. The microprocessor receives the electrical selection signals and provides the pump control data corresponding to the pump unit. The pump control data includes stepper motor direction data and number of steps data.

According to an embodiment of the present aspect, the disposable cartridge includes a chamber sealed with the plunger, the plunger having an expandable plunger top of resilient material deformable to an expanded state when the plunger is pushed by the threaded drive rod for dispensing the predetermined volume of fluid. The expandable plunger top returns to a relaxed state when the threaded drive rod is withdrawn from the plunger. A capillary tube is releasably connected to the outlet nozzle for directing the contents of the chamber to a dispensing area. In another embodiment, the pump unit includes a cartridge mount coupled to the stepper motor, the cartridge mount having a locking means with an aperture sized to pass the threaded drive rod and the disposable cartridge being adapted for engaging the locking means. The pump unit can include a driver card in electrical communication with the stepper motor, the driver card including a controller for controlling the stepper motor in response to pump control data. The pump unit can further include an electromotive force detector for detecting a predetermined position of the threaded drive rod. In the present embodiment, the pump mount includes an interface card adapted for electrically engaging the driver card for passing the pump control data when the pump unit is secured to the pump mount.

In a third aspect, the present invention provides a method for dispensing a volume of fluid from a disposable cartridge. The method includes the steps of receiving a selection signal from a user interface for dispensing the volume of fluid; providing an alert and locking the disposable cartridge if the volume of fluid is greater than a remaining amount of fluid in the disposable cartridge; and dispensing the volume of fluid from the disposable cartridge when the remaining amount of fluid in the disposable cartridge is at least the volume of fluid. According to an embodiment of the present aspect, the step of dispensing includes advancing a threaded drive rod for pushing a plunger in the disposable cartridge, in response to the selection signal. Pushing the plunger can include deforming an expandable plunger top of the plunger, and deforming the expandable plunger top before the plunger is moved by the threaded drive rod. The step of dispensing can include withdrawing the threaded drive rod away from the plunger by a predetermined distance after the volume of fluid is dispensed for returning the expandable plunger top to a relaxed state to draw fluid back into the disposable cartridge.

According to further embodiments of the present aspect, the step of providing an alert includes homing the threaded drive rod, and a further step of detecting an end position of the threaded drive rod. The step of detecting an end position of the threaded drive rod can include providing the alert, locking the disposable cartridge and homing the threaded drive rod.

In a fourth aspect, the present invention provides a cartridge plunger for receiving a piston. The cartridge plunger includes a hollow body and an expandable plunger top at a closed end of the hollow body. The hollow body includes an open end for receiving the piston. The expandable plunger top is located at a closed end of the hollow body and is deformable to an expanded state by the piston. The expandable plunger top returns to a relaxed state when the piston is withdrawn from the plunger by a predetermined distance. In an embodiment of the present aspect, the hollow body includes a first circular side-wall with a first diameter for defining a primary plunger chamber, and a secondary plunger chamber. The primary plunger chamber has the open end for receiving the piston and an internal shoulder at a second end for abutment with an edge of the piston. The secondary plunger chamber extends from the shoulder, and has the expandable plunger top formed therein. The expandable plunger top includes folds of resilient material.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

A cartridge-based concentrated flavour dispensing machine having pump units for delivering between a fraction of a milliliter and few ounces of fluids having a viscosity value between 1 to 4000 centepoise is described. The dispensing machine includes a cabinet for containing a multitude of pump units, where each pump unit is realisably connected to a disposable pre-filled fluid cartridge. Each pump unit includes a stepper motor in engagement with a threaded drive rod that is advanced or retracted by any one of several predetermined distances. The drive rod advances a piston positioned within the disposable cartridge to dispense a volume of fluid. The disposable cartridge operates in the same manner as a positive displacement pump. Flexible capillary tubes connected to the output of each disposable cartridge direct the fluid to a central dispensing area. When the disposable cartridge is depleted, the drive rod can be automatically retracted to facilitate disconnection and connection of disposable cartridges. An expandable plunger within the disposable cartridge will resiliently deform upon engagement by the advanced piston. After the dispensing operation, the piston is withdrawn from the expandable plunger to allow the deformed portion of the plunger to return to a resting state, thereby withdrawing fluid from the capillary tube and preventing drippage of the fluid.

Figure 4:
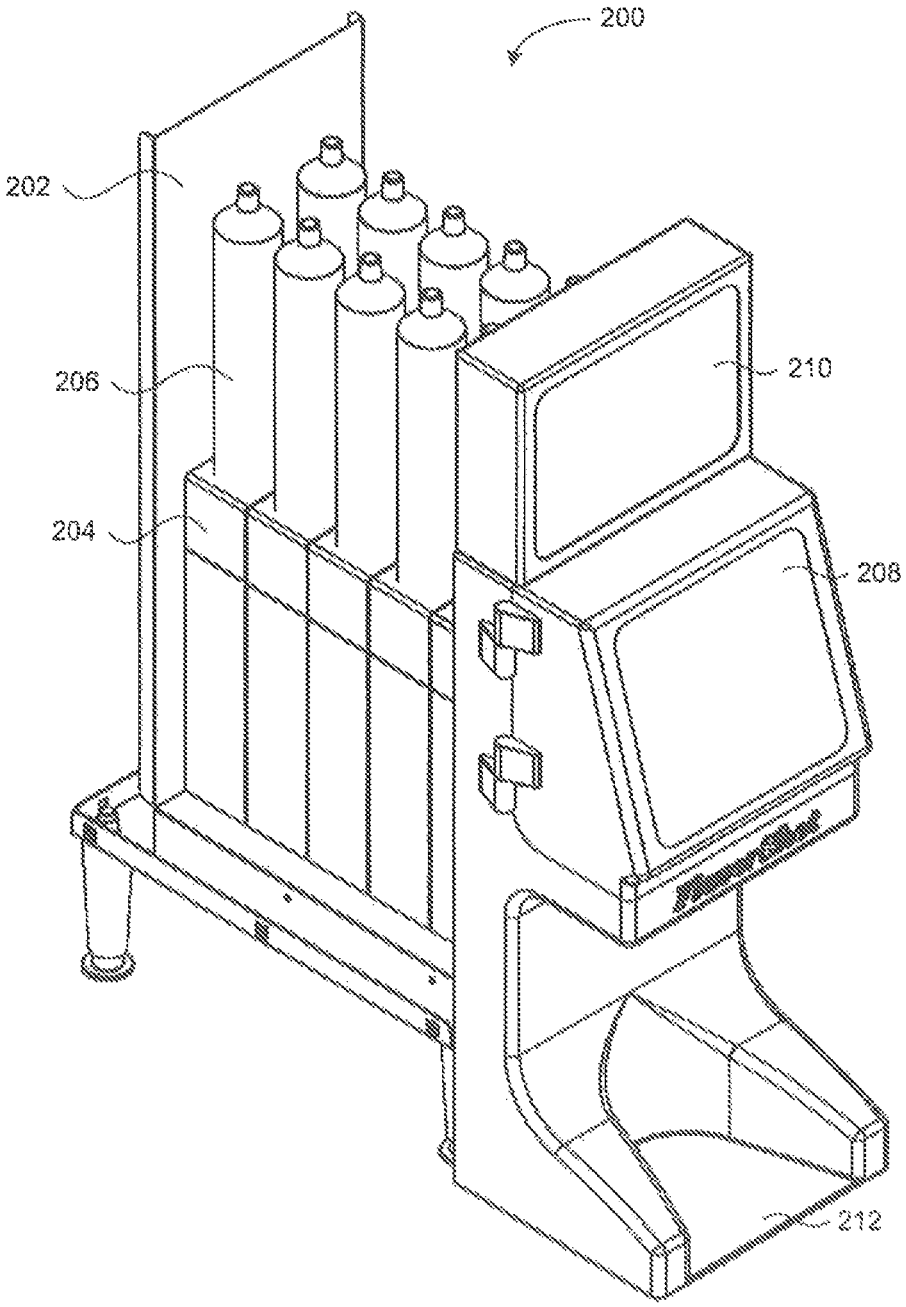
FIG. 4 is an illustration of a cartridge-based dispensing machine according to an embodiment of the present invention.

FIG. 4 is an illustration of a cartridge-based fluid dispensing apparatus according to an embodiment of the invention. Dispensing machine 200 includes a chassis 202 for storing pump units 204 attached to their respective disposable fluid cartridges 206. A pump mount (not shown) can hold up to ten pump units. Side and top panels (not shown) have been removed from the dispensing machine 200 to illustrate the orientation of the pump units 204 and fluid cartridges 206. A user interface panel 208 having buttons and a display allows a user to make a selection, while providing feedback to the user in the form of messages. A backlit advertising display panel 210 is provided, and a cup locator 212 is formed at the base of dispensing machine 200 to guide and position a cup. While not shown in FIG. 4 to simplify the drawing, capillary tubes are releasably connected or fixed to the output nozzle of each disposable cartridge 206, and direct the fluid to a central dispensing area (not shown) located underneath interface panel 208.

In the present example shown in FIG. 4, the dispensing machine 200 can dispense fluids from up to ten different pumps. The volume to be dispensed can depend on several categories of variables. These categories can include the type of base beverage, the size of the beverage, and modifier of the beverage. Within each variable category, there can be any number of choices.

Figure 1:
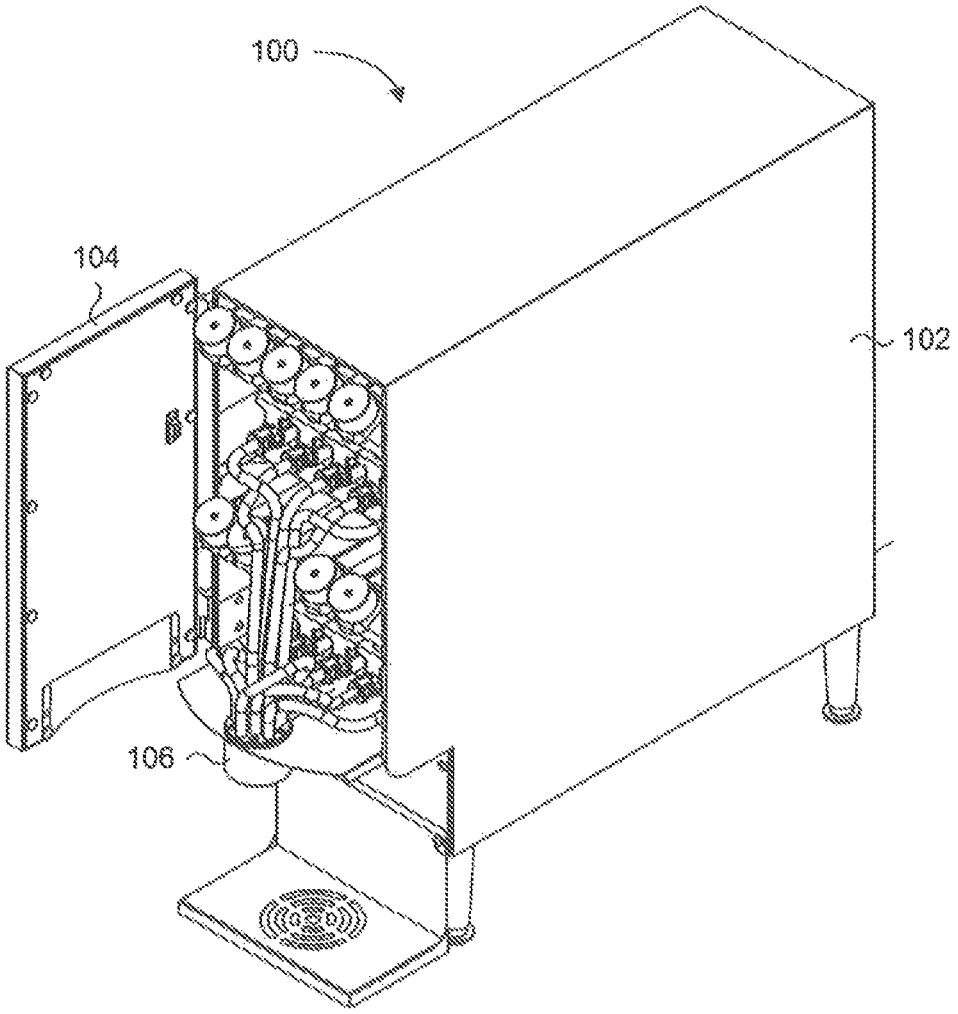
FIG. 1 is an illustration of a commercial dispensing machine.
Figure 2:
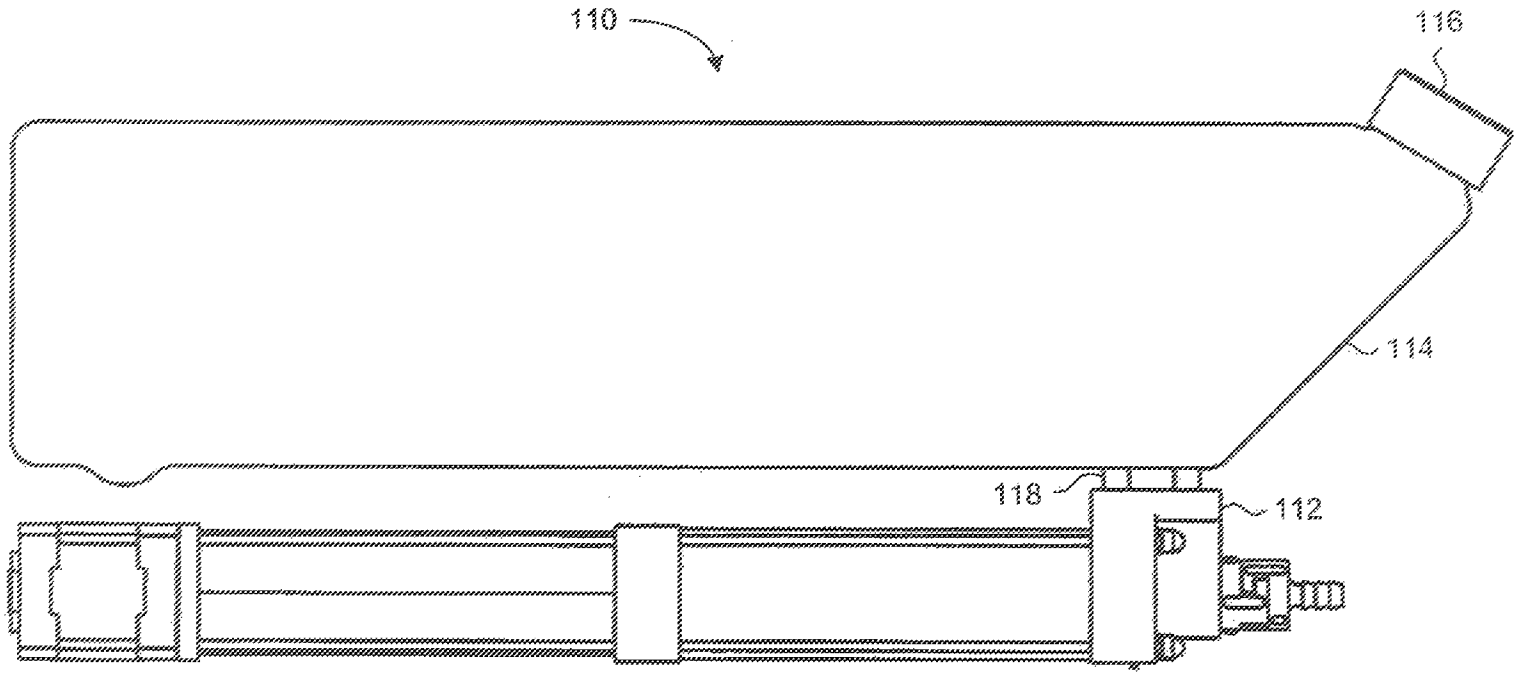
FIG. 2 is a side view of a displacement pump and tank system used in the commercial dispensing machine of FIG. 1.
Figure 3:
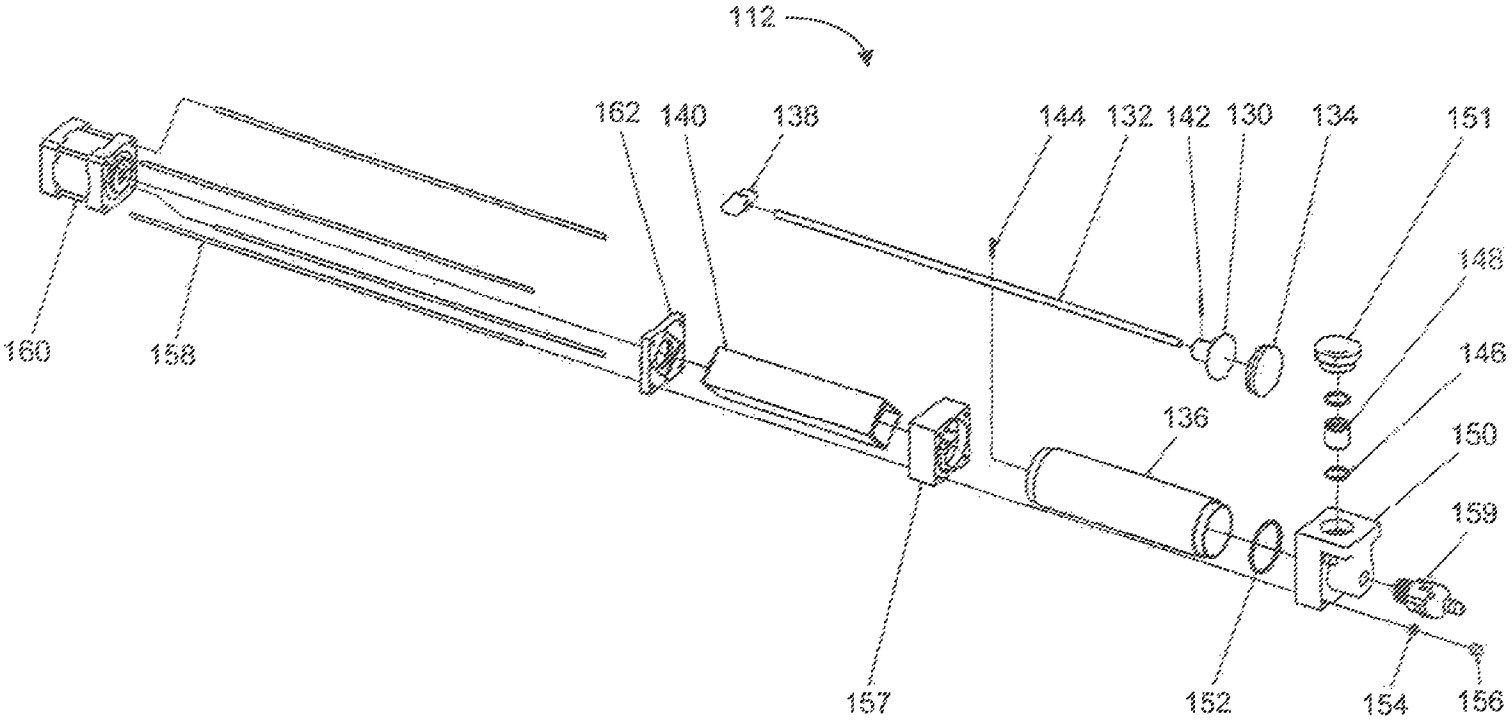
FIG. 3 is an exploded isometric view of the displacement pump shown in FIG. 2.
Figure 5:
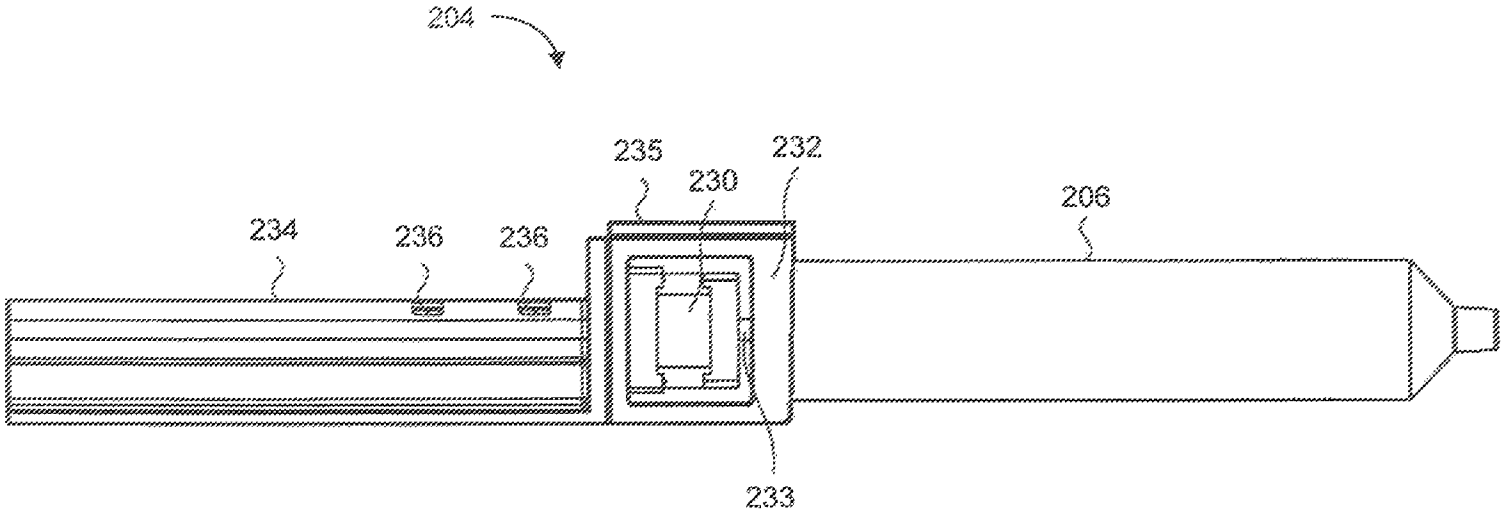
FIG. 5 is side view of a pump unit used in the cartridge-based dispensing machine shown in FIG. 4, according to an embodiment of the present invention.

FIG. 5 is an illustration of one pump unit 204 with an attached disposable fluid cartridge 206. The pump unit 204 includes a stepper motor 230 secured within a cartridge mount 232. The stepper motor 230 rotates to retract or advance a threaded drive rod 233. Secured to the cartridge mount 232 is an anti rotation bracket 234 to prevent a lead screw (not shown) from turning. As those skilled in the art will understand, the lead screw should not rotate relative to the stepper motor 230. Persons skilled in the operation of stepper motors, will understand that each pump unit 204 can be controlled to rotate the stepper motor in a first direction to advance the threaded drive rod 233 by any number of steps, and in a second direction to retract the threaded drive rod 233 by any number of steps. Anti-rotation bracket 234 can have any suitable configuration, such as the one shown in FIG. 3 which uses rod guide 138 within guide tube 140. A mounting means 235 is integrated with the cartridge mount 232 for securing the pump unit 204 to the chassis of the dispensing machine 200. Further details of this particular feature will be discussed later. Anti-rotation bracket 234 includes mounting holes 236 for receiving screws to which an interface connector (not shown) will be secured. As will be shown later, the front face of cartridge mount 232 includes locking means for receiving and securing disposable fluid cartridge 206 to cartridge mount 232.

Figure 6:
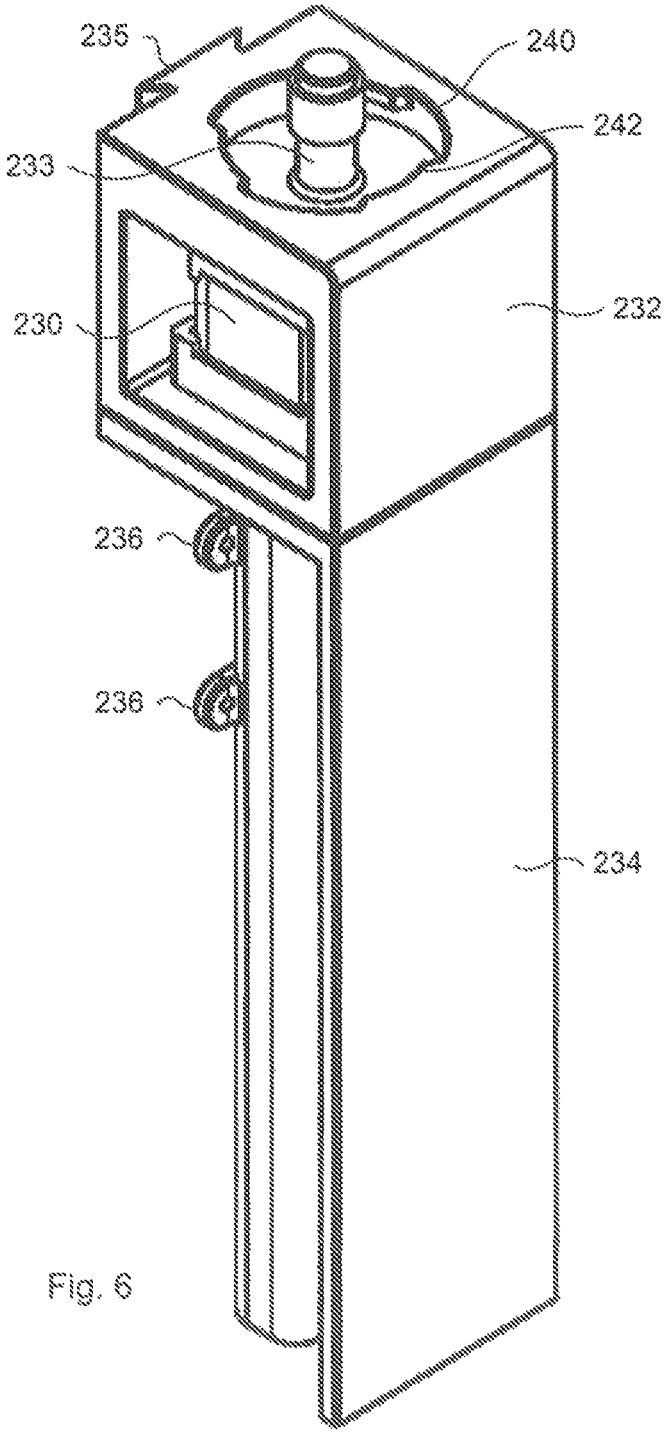
FIG. 6 is an isometric view of the pump unit shown in FIG. 5 without a disposable fluid cartridge, an embodiment of the present invention.

FIG. 6 is an isometric drawing of the pump unit 204 shown in FIG. 5 without disposable fluid cartridge 206. This drawing shows a portion of the mounting means 235, implemented as a dove tail mount for the present embodiment. This male dove tail mount slides into a correspondingly shaped female receptacle for holding the cartridge mount 232 to the pump mount plate of the dispensing machine 200. While a dove tail mount is used in this example, any suitably shaped mount, either male or female, can be used. A locking means 240 is integrated into the front face of cartridge mount 232, and implemented as a bayonet style twist lock. The threaded drive rod 233 extends through cartridge mount 232 and locking means 240. Locking means 240 is implemented as a circular shaped female cavity with three spaced apart locking tabs 242 extending towards the circle center from the periphery. Alternate embodiments can use any number of locking tabs 242, and are not limited to the three locking tabs 242 shown in FIG. 6. Although not shown, those skilled in the art will understand that tab stops can be formed underneath each locking tab 242.

Figure 7:
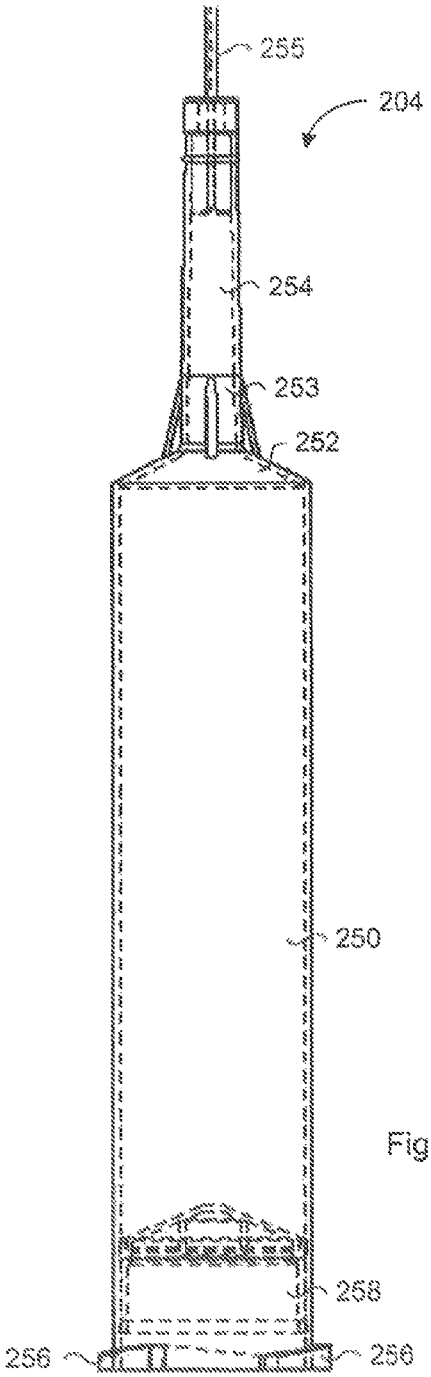
FIG. 7 is a side view of the disposable fluid cartridge shown in FIG. 5.
Figure 8:
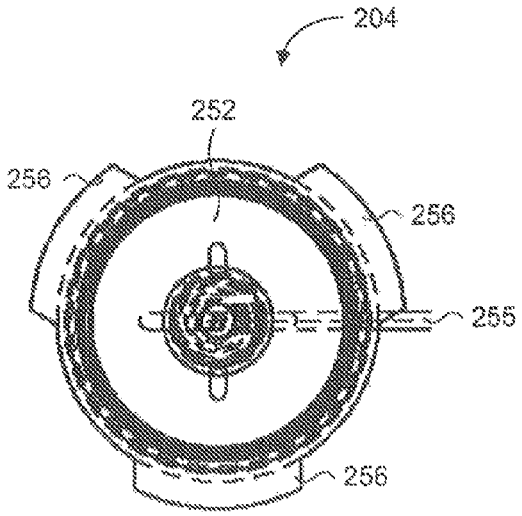
FIG. 8 is a top view of the disposable fluid cartridge shown in FIG. 5.
Figure 9:
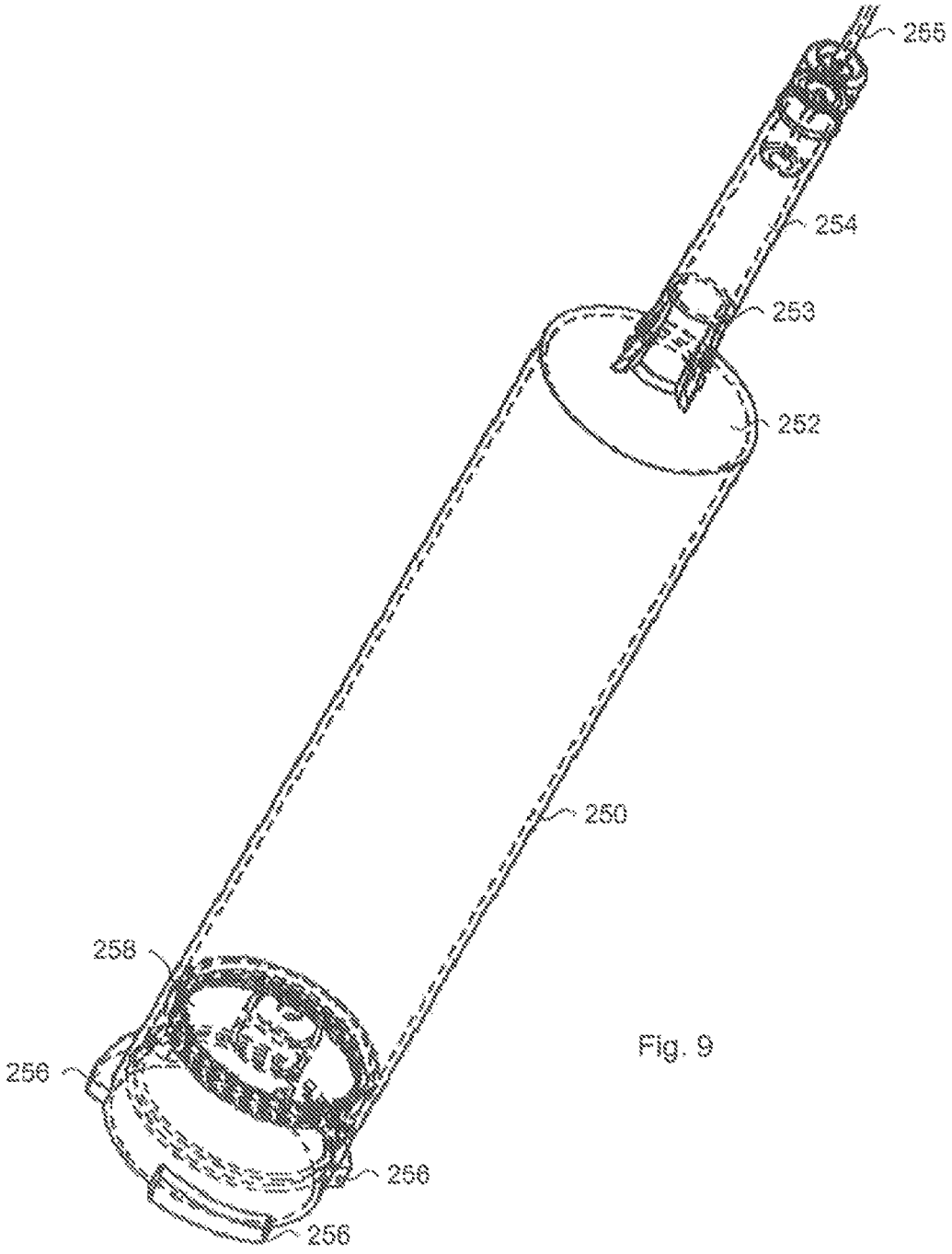
FIG. 9 is an isometric view of the disposable fluid cartridge shown in FIG. 5.

FIGS. 7 through 9 show drawings of disposable cartridge 206. Disposable cartridge 206 has a cylindrical body 250 having a frustoconical top portion 252 ending with an output nozzle 253. Releasably attachable to output nozzle 253 is nozzle cap 254 having a capillary tube 255 attached thereto. The bottom portion of disposable cartridge 206 has three helical-shaped engagement tabs 256 extending from the surface of cylindrical body 250 and being equally spaced apart. FIG. 8 is top view of the disposable cartridge 206 shown in FIG. 7, to illustrate the configuration of the three engagement tabs 256 formed around the base of disposable cartridge 206. The three tabs are sized and spaced apart to fit between locking tabs 242 of the locking means 240 of the cartridge mount 232. The present embodiment illustrates three engagement tabs 256, but any number can be used provided they are configured to mate with the locking tabs 242.

As those skilled in the art will understand, once the base of disposable cartridge 206 is inserted, locking is achieved by twisting the disposable cartridge 206 (ie. in a clockwise direction) such that each of the three engagement tabs 256 are frictionally wedged between the bottom of the cavity and the locking tabs 242. Over-twisting can be prevented as tab stops would prevent the engagement tabs 256 from sliding beyond a predetermined position. Those skilled in the art will understand that the tab stops are an optional feature since the engagement tabs 256 are wedge shaped. To unlock and remove disposable cartridge 206, ie. when it is empty, the disposable cartridge 206 is twisted in the opposite direction (ie. in a counter-clockwise direction), and pulled out. The capillary tube can be attached and removed from the output nozzle 253. In one embodiment, the assembly including the disposable cartridge 206 and the capillary tube are removed from the system when empty, so that it may be replaced with a new disposable cartridge 206 and capillary tube. The dispensing end will have a suitable mechanism for easily securing and releasing the capillary tube from the system.

Any person skilled in the art will understand that the bayonet style twist lock is merely one example of a locking means which can be used to secure the disposable cartridge 206 to the cartridge mount 232. Other suitable locking means can be used with equal effectiveness without departing from the scope of the invention.

Figure 10:
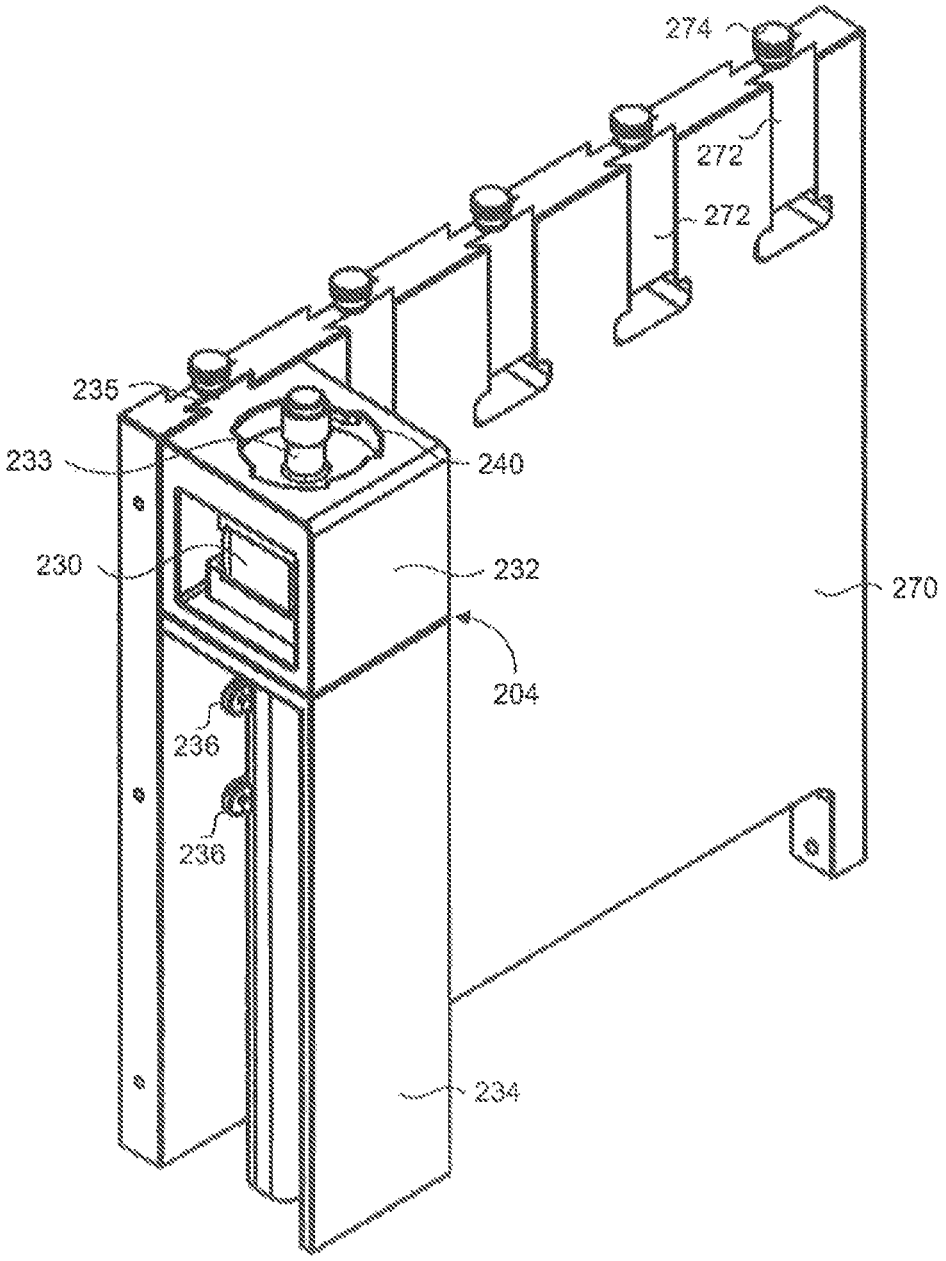
FIG. 10 is an isometric view of a pump mount of the cartridge-based dispensing machine shown in FIG. 4 having one attached pump unit, according to an embodiment of the present invention.
Figure 11:
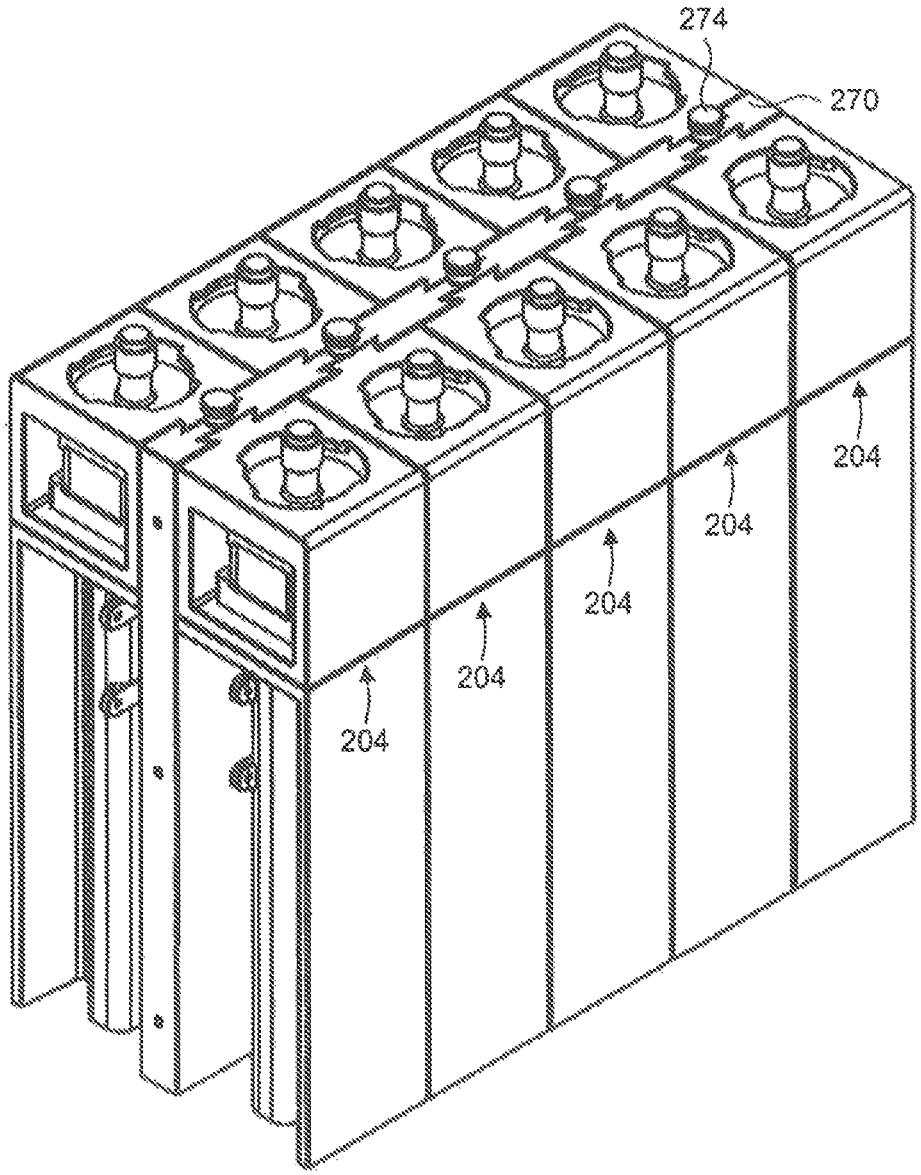
FIG. 11 is an isometric view of the pump mount of FIG. 10 having a plurality of attached pump units.

FIG. 9 is an isometric view of disposable cartridge 206 showing a plunger 258 positioned within cylindrical body 250. The disposable cartridge 206 is preferably made from plastic materials such as polyethylene, and has a polypropylene plunger 258 that is pressed into place at the filling operation. The plunger 258 has a recessed bottom portion for receiving an end of threaded drive rod 233, and has a shape similar to that of a common syringe plunger. The built-in plunger 258 forms a seal with the inner wall of cylindrical body 250, and is pushed by threaded drive rod 233 acting as a piston, when stepper motor 230 rotates to dispense the contents of the disposable cartridge 206. As previously mentioned, capillary tube 255 transfers the liquid from the cartridge to the cup when the plunger 258 is pushed, and is sized to prevent excess dripping when the dispense is stopped. For example, the inner diameter of the capillary tube 255 can be between 0.040 inches and 0.150 inches Previously shown FIGS. 5 to 9 show the features of a single pump unit 204, according to an embodiment of the present invention. FIGS. 10 and 11 show how multiple pump units 204 can be arrayed together in a compact configuration, while permitting easy access to the disposable cartridges 206 of each pump unit 204.

As previously shown in FIG. 4, all ten pump units 204 are oriented in an upright position to facilitate access to the disposable cartridges 206 by a user once the top and side panels, which may be integrated together, are removal or the drawer assembly is pulled out to the open position. Furthermore, the upright position allows any air within the cartridge to collect at the top of the cartridge. Thus the air can be expelled to maintain accurate dispenses. FIGS. 10 and 11 show how the pump units can be secured into the upright position.

FIG. 10 shows one pump unit 204 releasably connected to a pump mount 270. A primary advantage for having removable pump units 204 is to facilitate maintenance, repair, cleaning or replacement of the pump units 204 should it be required. The pump mount 270 is preferably rigidly secured by any means to the bottom of chassis 202. Pump mount 270 includes a total of ten female dovetail slots 272, or keyholes with five slots 272 or keyholes arrayed on opposite sides of pump mount 270. FIG. 11 shows ten pump units 204 installed within pump mount 270. In the present embodiment, pump mount 270 is centrally positioned within the chassis of the dispensing apparatus 200. In an alternate embodiment, pump mounts can be integrated with the opposing side-walls of the chassis.

Pump unit 204 has a corresponding dovetail mount 235 that slides into a female dovetail slot 272 in its installed position. The female dovetail slots 272 or keyholes are spaced apart to ensure that multiple pump units 204 can be compactly ganged together. While gravity alone should keep the pump unit 204 within its female dovetail slot 272, the pump unit 204 can be inadvertently pulled out by the user while he/she attempts to remove an empty disposable cartridge 206. Therefore, thumbscrews 274 can be screwed into the top edge of the pump mount 270 after the pump unit 204 is inserted to prevent the pump unit 204 from slipping out of the female dovetail slot 272. Thumbscrews 274 are positioned between opposing female dovetail slots 272, and preferably have a diameter that overlaps the entry area of each female dovetail slot 272. It is this overlapping of the thumbscrew that bars the inserted dovetail mount 235 from removal.

When installed to pump mount 270, each anti rotation bracket 234 forms a gap between the wall of pump mount 270 and mounting holes 236. This gap can be seen in FIG. 11, which shows a side view of a pump unit 204 secured to pump mount 270. As will be described below, this gap is preferred for accommodating signal interconnection means.

Figure 12A:
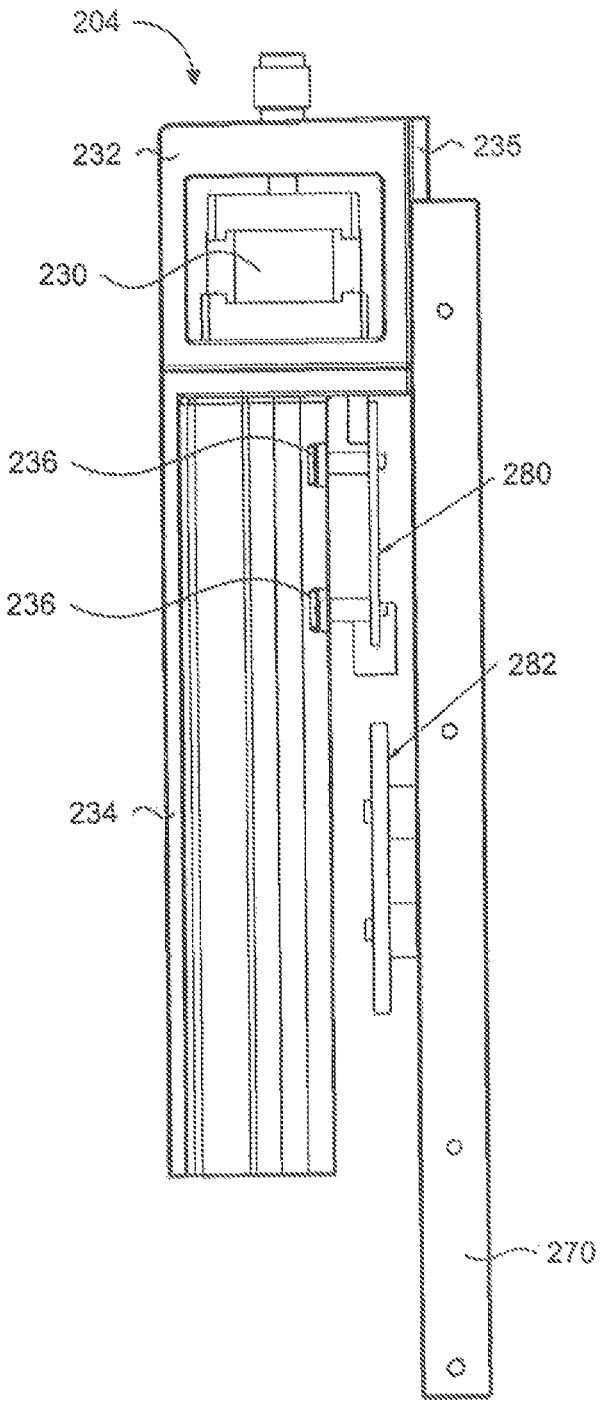
FIG. 12a is a side view of a pump unit installed within a pump mount showing an interface connector mating with an interface printed circuit board.

FIG. 12a shows a pump unit 204 partially inserted within female dovetail slot 272. In this figure, a driver card 280 is secured to the anti rotation bracket 234 via pins or screws through mounting holes 236. This driver card 280 mates with an interface printed circuit board (PCB) 282. According to a preferred embodiment, driver card 280 includes a microcontroller such as the Motorola MM908E625, for controlling its corresponding stepper motor. A local interconnect network (LIN) bus is used for the communication link between the motor and the user button panel and/or microprocessor. The interface PCB 282 can further provide power to the stepper motor 230. The driver card 280 can have permanent wiring between itself and the stepper motor 230, while interface PCB 282 can have permanent wiring between itself and the microprocessor. Mating connectors on driver card 280 and interface PCB 282 will be properly aligned to provide electrical contact with each other when pump unit 204 is fully inserted within female dovetail slot 272 or keyhole. Therefore, removal and installation of the pump unit 204 dues not require manipulation of any electrical wiring or connectors, since the electrical connection between the pump unit 204 and the interface PCB 282 is automatic upon full insertion of the pump unit 204 within female dovetail slot 272 or keyhole.

Figure 12B:
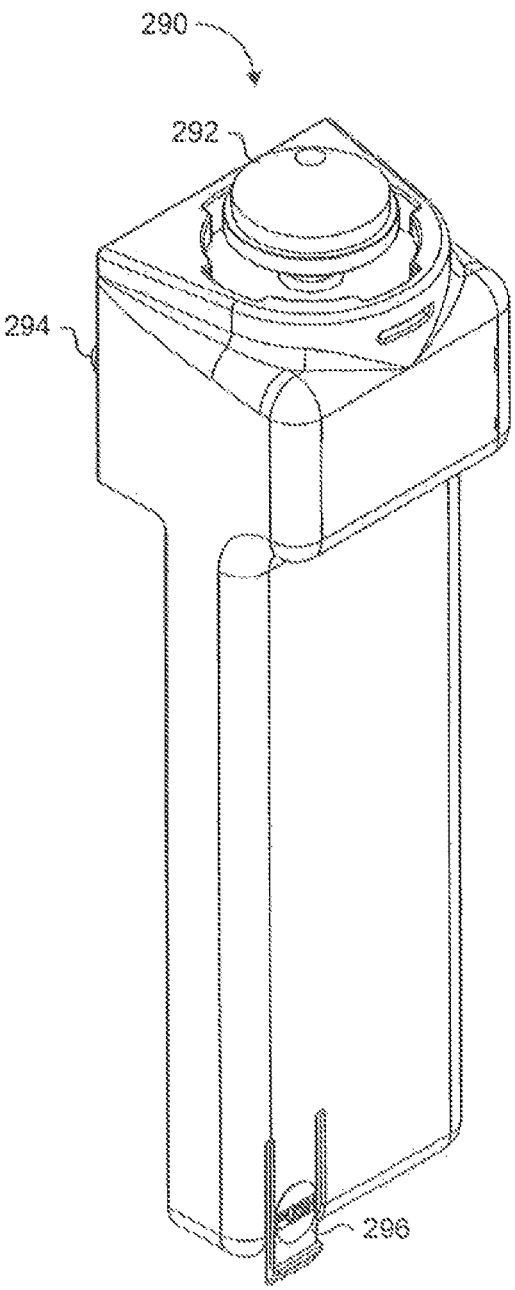
FIG. 12b is an isometric view of an alternate pump unit.
Figure 12C:
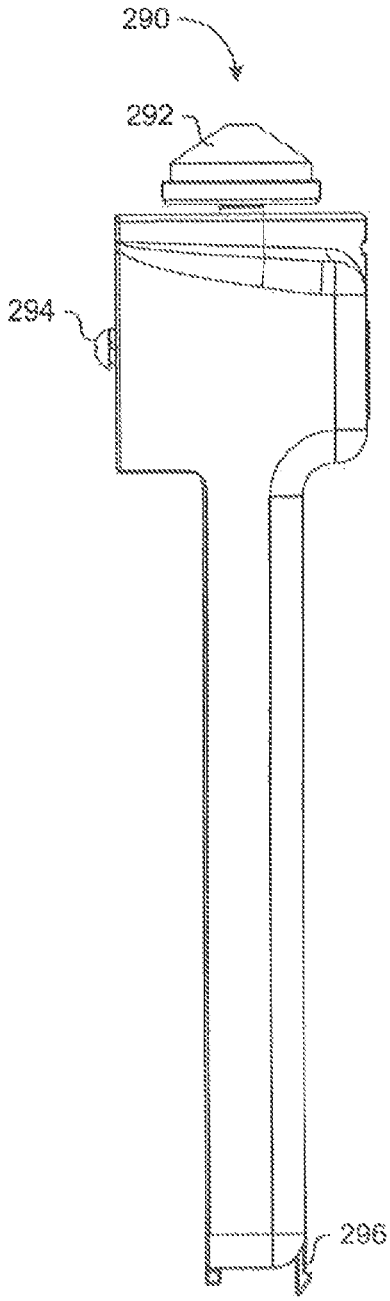
FIG. 12c is a side view of the alternate pump unit of FIG. 12b.

FIGS. 12b and 12c are isometric and side views respectively, of an alternate pump unit. Alternate pump unit 290 is shown having a piston head 292 fixed to the end of the drive rod and shaped for engaging a correspondingly shaped plunger in the disposable cartridge. Further details of the piston head and the plunger will be discussed later. Pump unit 290 includes alternate features for securing it to the pump mount 270 or chassis of the dispensing system. For example, instead of the dove tail mount 235 shown in FIG. 12a, a screw head 294 can be used for sliding into a correspondingly shaped keyhole (not shown) of the pump mount 270. Those skilled in the art will appreciate that there are many different methods for securing the pump unit 204 to the pump mount 270, and those mentioned above are examples of such possible methods. Instead of using thumbscrews 274 for retaining the pump units in their installed position onto pump mount 270, the bottom end of pump unit 290 will have a flexible tab 296 that will naturally deflect upon insertion into a base having an appropriately shaped slot for securing it to the pump mount 270. To remove the pump unit 290, the flexible tab 296 is deflected as the pump unit 290 is withdrawn from the pump mount 270, thereby disengaging the locking mechanism of the flexible tab 296 with the base. Persons skilled in the art will understand how such locking mechanisms work.

Figure 13:
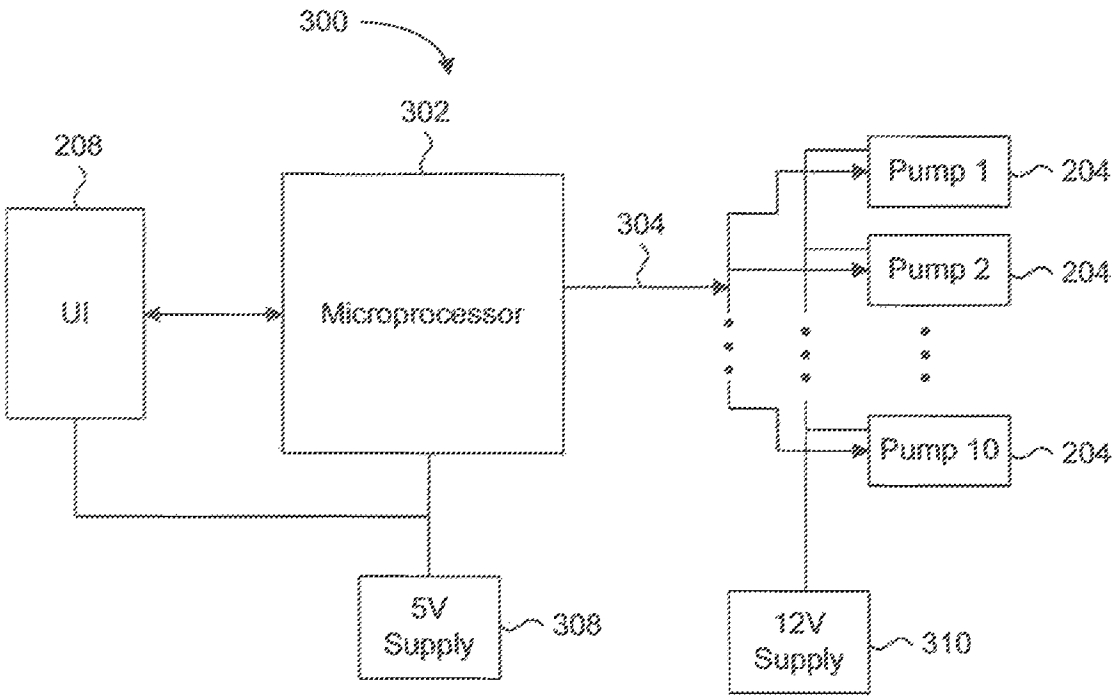
FIG. 13 is a functional block diagram of the cartridge-based dispensing machine of FIG. 4.

FIG. 13 is a block diagram representing the functional components of dispensing machine 200 shown in FIG. 4. In addition to the already described components of dispensing machine 200, FIG. 13 shows the electronic systems that control them. Accordingly, the functional components of FIG. 13 that correspond to the components shown in the preceding figures are numbered the same.

Dispensing system 300 includes user interface 208, microprocessor 302, a LIN bus 304 connected between the microprocessor 302 and pump units 204, 5 volt power supply 308 and 12 volt power supply 310. Each pump unit 204 can include a respective driver card for controlling the stepper motor it is associated with. User interface 208 includes button actuators of the capacitive or piezoelectric sensor type, for sending electrical selection signals to microprocessor 302, and LCD driver circuitry for receiving predetermined display data from microprocessor 302. LCD driver circuitry drives an LCD display with alpha-numeric characters for providing user feedback.

Microprocessor 302 is preferably programmable to permit the manufacturer to install pre-set control algorithms and pump unit control data for all valid selection combinations. An example of a suitable microprocessor is the Motorola MC68HC908AB32 with non-volatile Flash memory. The Flash memory can store boot loader software and application software for the microprocessor 302. The boot loader code is a small piece of code in a protected portion of Flash memory programmed by the manufacturer, while the application code is the main software that contains all of the functional procedures associated with the dispensing system 300. Details of the boot loader software and the application software, according to an embodiment of the present invention follows.

The boot loader is used to fetch new application code, new driver software, or other dispense parameters via any suitable port, such as an infrared port for example. The new code is downloaded when an infra red programming device pointed at the button panel on boot up is detected. This code can be stored in the Flash memory. If there is no infra red device and the current application software is valid, the microprocessor 302 will run the present application code.

The application code executed by the microprocessor 302 monitors/scans user interface 208, and performs the necessary calculations or look up table functions for issuing pump control data in response to user selections. Additional functions of the application code can include controlling the display of user interface 208, monitoring remaining fluid in each disposable cartridge, executing a programming mode of operation, and updating driver software of the pump units 204.

It should be noted that different retailers may use different types of concentrated flavourings, and hence the volume to dispense per fixed beverage size may differ. Microprocessor 302 receives the electrical selection signals from the user interface 208. The electrical selection signals can correspond to the selected flavouring, and selected dispense quantity. Once determined, microprocessor 302 can issue the corresponding pump control data, which can include the specific pump unit 204 to be actuated and the quantity of concentrated fluid to be dispensed from it. More specifically, the quantity of concentrated fluid to be dispensed is part of a drive profile issued via LIN bus 304 to the driver card of one or more pump units 204 to dispense the required volume of flavour(s). As previously discussed, the drive profile can be derived by calculation or from a look up table. The drive profile can include parameters such as stepper speed data, number of steps data, direction and back electro magnetic force (EMF) detection threshold data.

The user can manually adjust the existing programming through the user interface 208. When in the program mode of operation, the dispense volumes for each flavouring can be adjusted by 0.1 milliliters. However, the sheer number of possible combinations renders manual programming cumbersome and time consuming. In the present ten flavour embodiment of the dispensing machine 100, there are greater than 700 possible adjustments that can be made. To facilitate re-programming or updates to the factory pre-set programming, a communication port can be coupled to the microprocessor for receiving any new software. The communication port can be a wired port, such as an RS-232, a USB port, or a LIN bus in communication with a computer or device capable of transferring the new programming. Alternatively, a wireless port, such as an IR port, WiFi or Bluetooth transmitter/receiver can be used. Those of skill in the art will understand how to interface such communication ports with microprocessor 302.

The programmability of microprocessor 302 permits tracking of remaining concentrated flavouring fluid in each disposable cartridge 206 coupled to each pump unit 204. Since the volume of each dispense is known, and the full level volume of the disposable cartridge 206 is known, the microprocessor can store a current remaining volume of concentrated fluid so that a visual and/or audio alert is emitted once a predetermined empty level threshold is reached. Of course, a low level indication can be provided by microprocessor 302 through the display of user interface 208 when the remaining volume of concentrated fluid has reached a predetermined level. When the specific cartridge is determined to be empty, an alert can signal the user to replace the empty disposable cartridge, and optionally locks out the specific flavouring from being further dispensed, until it is reset. Alternately, an electromechanical trigger can be used to detect the empty state of the disposable cartridge 206. For example, each driver card 280 can include a back EMF (electro magnetic or motive force) detection circuit for detecting an end position of the threaded drive rod 233.

Microprocessor 302 can be further programmed to provide timed events. In particular, certain concentrated flavourings may have a limited shelf life, thus necessitating a purge of the stored flavouring after a predetermined span of time, such as 1 month for example. A replaced disposable cartridge 206 would then reset the associated timers.

Following is a brief discussion of the function of the driver card coupled to each pump unit 204. The driver cards are slave devices that respond to commands from the microprocessor 302. Each driver card preferably has its own microprocessor, such as a Motorola MM908E625 microprocessor, stepper driver hardware, a back EMF detection circuit to detect end stops, and a LIN Bus physical layer. The driver card microprocessor includes its own boot loader software and application software. The primary function of the driver code software is to wait for a drive profile from the microprocessor 302. The software then drives the motor as specified, and then sends a response indicating the driving is done and also if it was complete or the back EMF detection stopped it before all of the required steps could be completed.

The driver card functions as a pump driver for actuating one stepper motor 230. More specifically, the driver card provides motor drive signals, such as direction of rotation and step signals to turn stepper motor 230 of pump unit 204. Accordingly, the number of pre-calibrated steps corresponds to the desired quantity of concentrated fluid to be dispensed. Additionally, due to the high viscosity of 4000 centepoise fluids, the speed at which the stepper motor 230 rotates is optimized to ensure that an overpressure condition does not occur during the dispense stroke, causing the stepper motor to skip or the capillary tube to pop off the output nozzle 254. Those of skill in the art will understand that different pump units 204 in the same dispensing machine 100 can be programmed to step at different rates. For example, one pump unit 204 can dispense 4000 centepoise fluids while another can dispense two centepoise fluids. Hence the speed, torque and accuracy for each stepper motor 230 can be optimized for maximum performance and reliability.

In the presently shown embodiment, each pump unit 204 has its own dedicated driver card for controlling its associated stepper motor 230. In an alternate embodiment, the stepper motors from all the pump units 204 can share a single pump driver circuit. In such an embodiment, a multiplexing circuit can be used to pass the direction of rotation and step data from the single pump driver to one of the pump units 204. Practically, this multiplexing circuit can be implemented as a set of individual relay devices, each individually selectable by microprocessor 302 for coupling the data to the corresponding pump unit 204.

Figure 14:
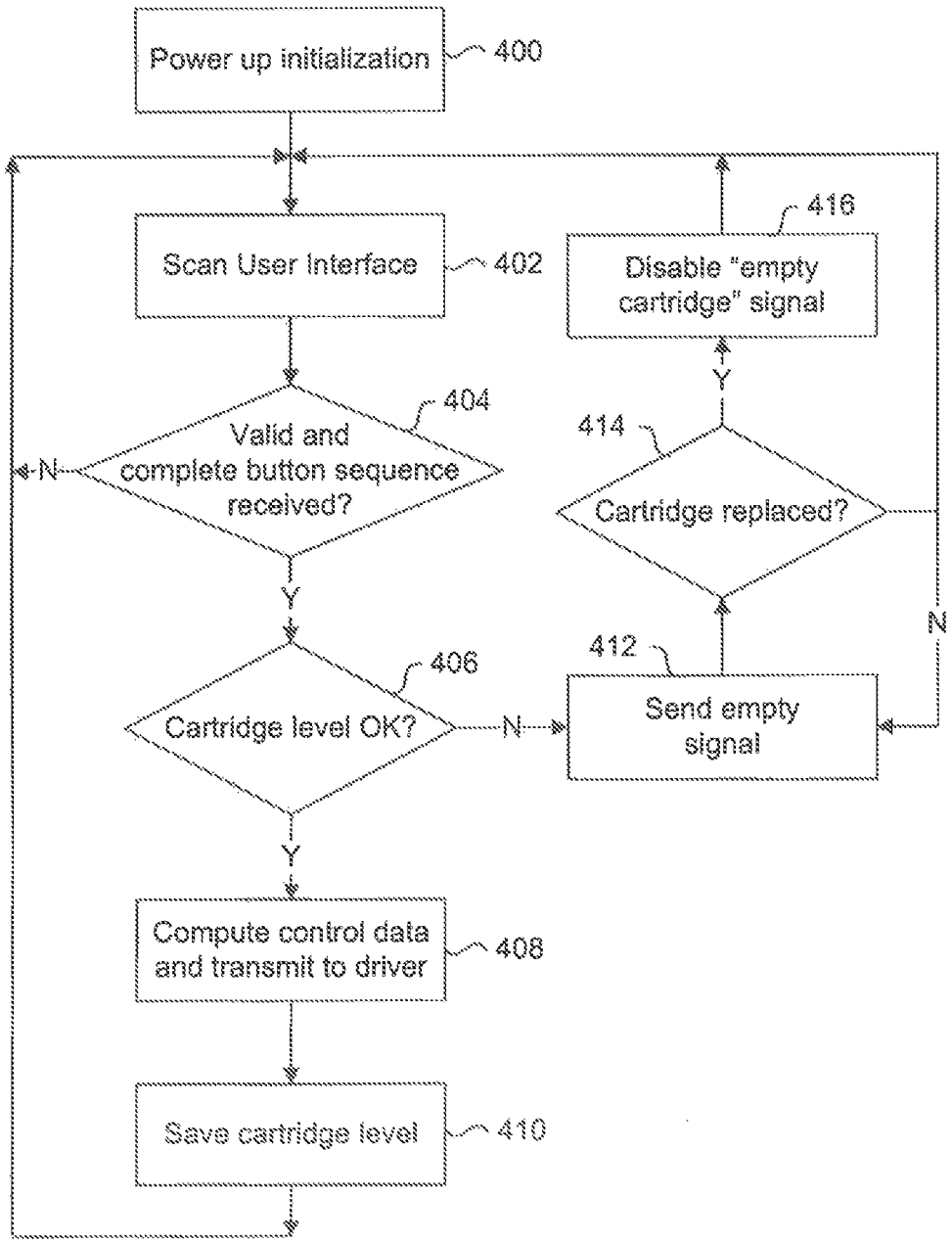
FIG. 14 is a flow chart illustrating operation of the dispensing machine shown in FIG. 13, according to an embodiment of the present invention.
Figure 15:
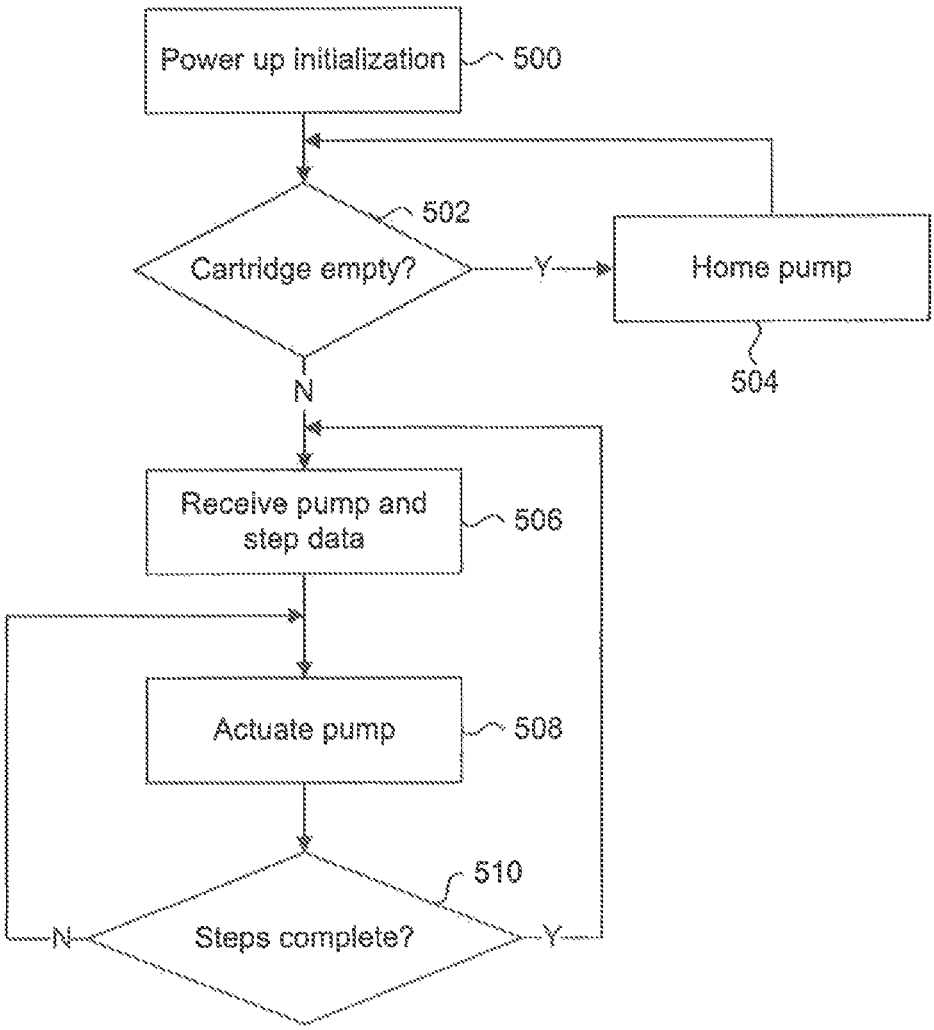
FIG. 15 is a flow chart illustrating operation of the pump driver shown in FIG. 13.

Following is a description of the operation of dispensing system 300 according to an embodiment of the present invention, with reference to the flow charts in FIGS. 14 and 15. The flow chart of FIG. 14 steps through the primary control routine of dispensing system 300 as executed by microprocessor 302, while the flow chart of FIG. 15 steps through a sub-routine executed in tandem by pump driver 304. It is assumed for the present example that all the pump units 204 are ready for dispensing concentrated flavouring fluids. In FIG. 14, the primary control routine begins at step 400 when the power supplies 308 and 310 of dispensing system 300 are turned on. At this time, new code can be downloaded through the appropriate port, such as an IR port for example. This downloaded code can then be forced to the driver cards of each pump unit 204. More specifically, microprocessor 302 queries each driver card for its respective software number and revision. Any downloaded driver software having a newer version is automatically sent to the driver cards. This code can include user interface software and control software for the stepper motors of each pump unit 204. This code can further include pump control data, or drive profiles, for specific stepper motors. The drive profile can include parameters such as stepper speed data, number of steps data, direction and back EMF detection threshold data. This listing of parameters is not comprehensive, and can thus include other related parameters. Port downloading of code is a preferred feature for multiple pump unit parameter modification, since manual modification of parameters for all the pump units 204 can be cumbersome and time consuming.

During the power up initialization of step 400, the microprocessor 302 waits until a synchronization signal is received from the pump drivers of each pump unit 204 before proceeding to step 402. At step 402, the user interface 110 is scanned for a user selection. Once the selection has been made, the validity of the selection and/or selection sequence is assessed at step 404. Valid sequences can be predetermined and programmed in advance. The valid sequence can either be a flavour selection or a program mode entry sequence. Once the program mode is entered, prompts can be displayed on the LCD display to instruct the user regarding the adjustments that can be made.

If the sequence corresponds to a program mode, then the user is prompted to change values for parameters regarding dispense of the particular flavouring. These can include stepper speed, number of steps, and back EMF detection threshold for example. Once the changed values have been entered, they are dispersed to corresponding driver card via the LIN bus.

If the selection is invalid, the routine loops back to step 402 and a message can be displayed to the user for indicating the invalidity of the entered selection. Otherwise, the routine proceeds to step 406 to determine if there is sufficient flavouring in the selected disposable cartridge. The amount of flavouring remaining in each cartridge can be tracked by the microprocessor. Since the full volume of a new disposable cartridge is known, and the amount of fluid to dispense is known, the microprocessor can execute the mathematical operation of subtracting dispensed volumes from the currently remaining volume. As previously mentioned, detection of an empty cartridge am be done through electromechanical means, such as an EMF detector. Alternately, in a system that does not track the remaining volume of each disposable cartridge, the assessment of an empty cartridge can be done solely through the EMF detector after the fluid is dispensed.

If there is sufficient flavouring remaining in the disposable cartridge to meet the requested dispense volume, the routine proceeds to step 408 where the microprocessor 302 computes the appropriate control data for the selection, and sends the appropriate data to the driver card of the selected pump units 204 through the LIN bus. This data can include step count and drive profile data. Thus the desired pump unit 204 is actuated. This control data takes into account the specific flavouring, size of the beverage, type of beverage and any modifiers or other variables that may be relevant to the quantity of concentrated flavouring to dispense. Once the dispense operation for the selection has been completed, the remaining amount of flavouring in the disposable cartridge can be updated at step 410, and the routine loops back to step 402 to receive a new selection.

If at step 406 there is insufficient flavouring remaining in the disposable cartridge to meet the requested dispense volume, a message can be displayed at step 412 to indicate to the user that a particular disposable cartridge needs to be replaced. At this time, the microprocessor 302 preferably fully retracts the threaded drive rod corresponding to the empty disposable cartridge. At step 414, the system checks if the disposable cartridge has been replaced. This can be done manually by the user or automatically by the system.

An example of manual detection includes the use of reset buttons corresponding to each pump unit 204 mounted to the button panel or to the inside of the chassis and accessible only by removing the top and side panels. Then the user presses the appropriate reset button after a new disposable cartridge has been installed. In response to the depressed reset button, the specific stepper motor can advance its threaded drive rod to abut the plunger of the disposable cartridge, and the microprocessor 302 will reset the volume for that flavouring.

An example of automatic detection includes the use of sensors, such as electro-mechanical sensors, for detecting removal of the old disposable cartridge. This can be as simple as a spring loaded, depressible pin or flange integrated into the cavity of the locking means 240. Insertion of a disposable cartridge sets the trigger of the sensor, and removal of the disposable cartridge triggers reset for the pump unit 204. Persons skilled in the art will understand that there can be many different sensors and mechanisms for manually or automatically resetting a pump unit.

Returning to the flow chart of FIG. 14, while in the loop between steps 412 and 414, the system can return to step 402 to receive new selections, but the currently empty flavour will be locked out. If the disposable cartridge has been replaced, then the message is disabled at step 416 and the system returns to step 402 while releasing the lock out for the previously empty flavour.

In the case where a selection sequence corresponds to a combination dispense where several flavour fluids are to be dispensed, the current recorded level of concentrated flavour fluid for each disposable cartridge is checked. If any one is effectively empty for the current dispense, then the combination dispense is cancelled and the appropriate message is displayed. In the case where a combination dispense is executed, the control data is sent sequentially to each pump unit 204.

The pump driver sub-routine shown in FIG. 15 is now discussed with reference to the primary control routine previously described in FIG. 14. The pump driver sub-routine begins at step 500 when power supply 314 is turned on. This power up initialization step occurs at the same time as the power supplies 308 and 310 are turned on in step 400 of FIG. 14. A synchronization signal can be sent back to the microprocessor 302 to allow the primary control routine to begin scanning of the user interface at step 402. In the present embodiment, a synchronization signal can be sent every six seconds to maintain an open communications link. If new code was downloaded and pushed by the microprocessor 302, then this new code is downloaded to the driver card through the LIN bus. If new parameters were entered manually through the button panel in the program mode, these new parameters would then be downloaded. Now the pump driver 304 is ready to receive control data from microprocessor 302 to actuate one or more pump units 204 in response to a selection.

At step 502, the presence of an empty signal is checked for each pump unit 204. This empty signal is generated at step 412 in the primary control routine of FIG. 14. If the empty signal is received, then the particular pump unit 204 is homed at step 504, and loops back to step 502 to monitor the status of the disposable cartridge (ie. if the disposable cartridge has been replaced). Otherwise, the sub-routine proceeds to step 506 for receiving the control data provided by microprocessor 302.

At this point, one or more pump units 204 receive control signals microprocessor 302. The selected pump unit(s) 204 is actuated by the predetermined number of steps in step 508, and the predetermined volume of concentrated flavouring fluid is dispensed. In a system where multiple flavours are dispensed in parallel, the sub-routine of FIG. 15 ends at step 508, and each pump unit 204 sends an end of drive message via the LIN bus back to the microprocessor. In an alternate system where multiple flavours are dispensed in sequence, the sub-routine of FIG. 15 would continue as follows. A determination is made at step 510 to assess if there are any further dispense operations for the present selection. If the dispense operation for the present user selection is complete, the sub-routine loops back to step 506 to await further pump and step control data. Therefore, each pump unit 204 is actuated in sequence in response to the control data received in step 506.

As previously discussed, a capillary tube is used for transferring fluid from the disposable fluid cartridge to the central dispensing area, and is selected to be a size for minimizing fluid drippage after a dispensing operation is completed. However, depending on the fluid, there may be a residual drop hanging on the end of the capillary tube after the dispense. This residual drop can fall at a later time into another container for which a dispense of a different flavouring is desired. This will result in a mixing of flavours, thereby changing the flavour of the beverage. Alternately, this residual drop will hang on and be exposed to the air until next dispense. If the plunger is fixed to the piston, then the stepper motor can be operated to withdraw the plunger by a preset distance, thereby creating a negative pressure in the cartridge to draw the fluid product back into the capillary tube. However, in the presently shown embodiments of the disposable fluid cartridge, the plunger and the piston are not fixed to each other, therefore the plunger cannot be withdrawn as the piston is withdrawn by the action of the stepper motor and threaded drive rod.

Figure 16:
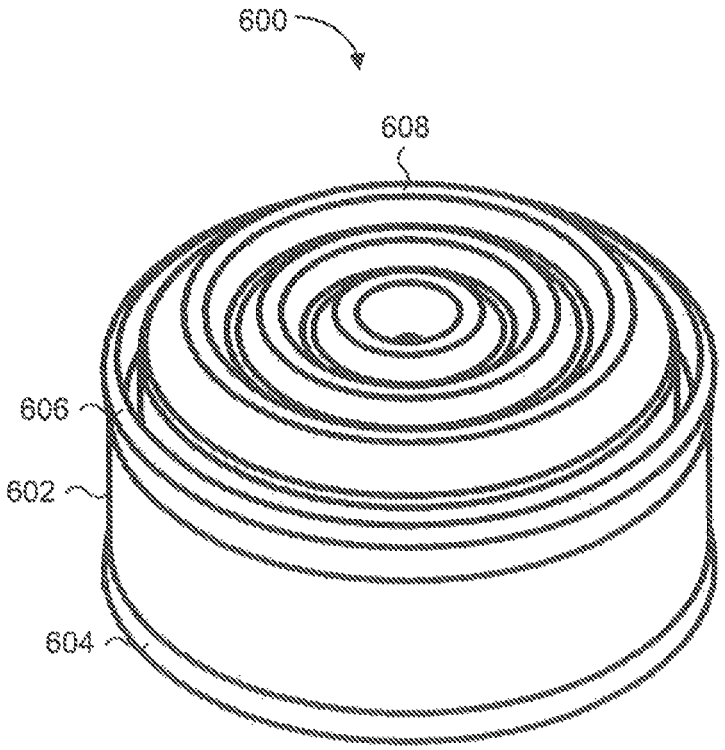
FIG. 16 is an isometric view of an expandable plunger, according to an embodiment of the present invention.

According to an embodiment of the present invention, an expandable plunger is provided for creating a negative pressure in the cartridge when the piston is withdrawn from the plunger after a dispense operation. An isometric view of an expandable plunger according to one embodiment is shown in FIG. 16. Expandable plunger 600 is circular in shape and constructed of a resilient material. The expandable plunger 600 includes a side-wall 602, a lower sealing flange 604 radially extending away from a bottom end of side-wall 602, an upper sealing flange 606 radially extending away from a top end of side-wall 602, and an expandable plunger top 608. The expandable plunger top 608 has a maximum diameter that is less than the maximum diameter defined by side-wall 602. The top surface of expandable plunger top 608 includes folds of resilient material arranged in a corrugated configuration, which allows for expansion in response to an applied force from the underside of the top surface. In use, the expandable plunger top 608 is positioned towards the outlet of the cartridge and sized to fit within the diameter of the cartridge.

Figure 17A:
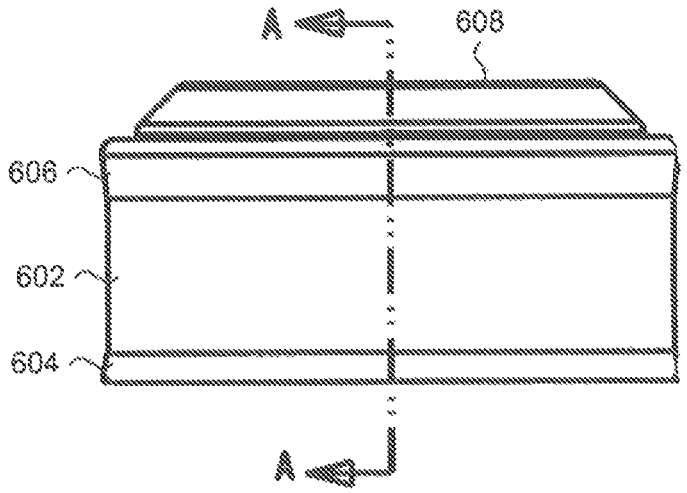
FIG. 17a is a side view of the expandable plunger shown in FIG. 16.
Figure 17B:
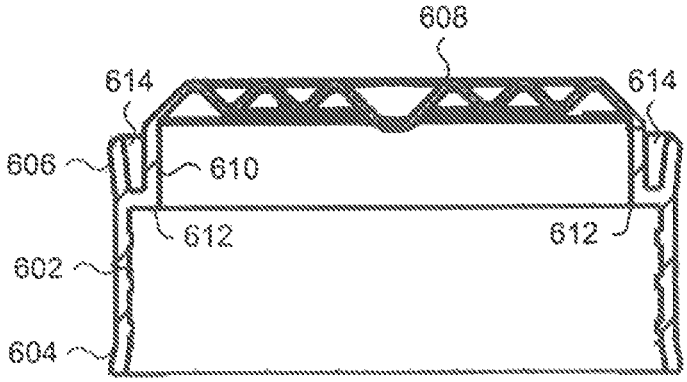
FIG. 17b is a cross-sectional view of the expandable plunger of FIG. 17a taken along line A-A.

To further illustrate the features of the expandable plunger 600, FIG. 17a shows a side view of the expandable plunger 600 shown in FIG. 16, and FIG. 17b shows a cross-sectional view of the expandable plunger 600 of FIG. 17a, taken along line A-A. The expandable plunger 600 is a hollow body, where the side-wall 602 and the lower sealing flange 604 form a primary plunger chamber while an upper side-wall 610 defines a secondary plunger chamber. An internal shoulder 612 is provided for supporting the upper side-wall 610 and further functions as a stop for a suitably shaped piston, as will be described later. It should be apparent to those skilled in the art that internal shoulder 612 is concentric with the upper side-wall 610. In alternate embodiments, the internal shoulder 612 can be sloped instead of being formed at a right angle to the side walls 602 and 610.

Lower sealing flange 604 is an optional feature that helps prevent expandable plunger 600 from sliding in a direction away from the cartridge outlet as the piston is retracted. The upper sealing flange 606 is an optional feature, which forms a channel 614 with upper side-wall 610, which is configured to receive the fluid product in the cartridge as the expandable plunger 600 is pushed towards the cartridge outlet for dispensing the fluid product. As the expandable plunger 600 is pushed, the pressure of the fluid in the cartridge will bias the upper sealing flange 606 to open, or further extend away from the side-wall 602, thereby improving the seal provided by expandable plunger 600.

Figure 18A:
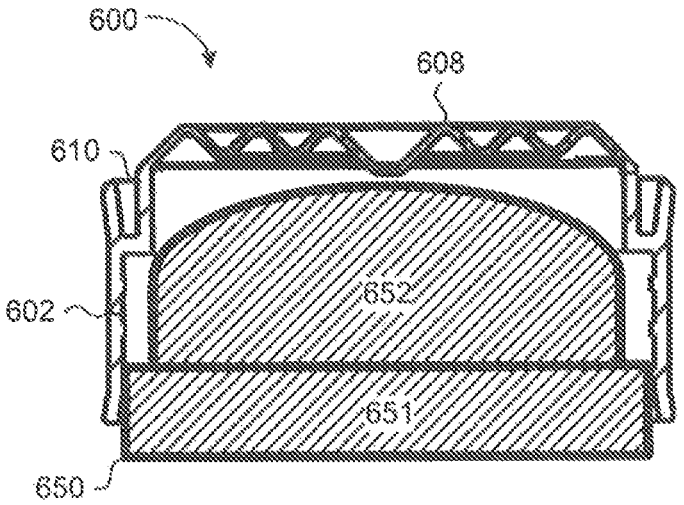
FIG. 18a is the cross-sectional view of the expandable plunger of FIG. 17b with a piston prior to a dispense operation.
Figure 18B:
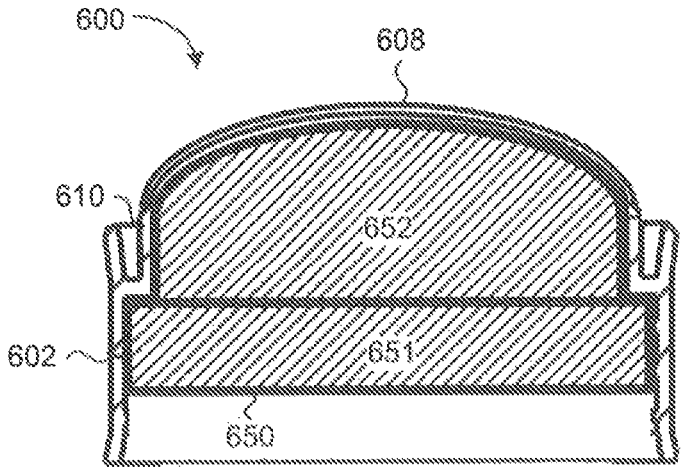
FIG. 18b is the cross-sectional view of the expandable plunger of FIG. 17b with the piston during a dispense operation.

The folds of resilient material of expandable plunger top 608 can be deformably stretched, expanded or elongated, in the direction towards the cartridge outlet. FIG. 18a shows the expandable plunger 600 in a relaxed state before engagement with a piston 650 for a dispense operation, and FIG. 18b shows the expandable plunger 600 in an expanded state when fully engaged with the piston 650 during a dispense operation. The piston 650 will be shaped to correspond with the shape of the primary and secondary plunger chambers of the expandable plunger 600. More specifically, piston 650 will have a base 651 with a diameter sized to fit within the primary chamber defined by side-wall 602, and an extender 652 with a diameter sized to fit within the secondary chamber defined by upper side-wall 610. In the present example, the top of extender 610 is rounded, but in alternate embodiments, the top of extender 610 can take on any desired shape. According to the present embodiment the height of the extender 610, which is defined from the base 651 to its top-most point, will be greater than the height of upper side-wall 610. More specifically, the height of extender 610 will be selected such that expandable plunger top 608 will be elongated by the top-most portion of extender 610 before the base 651 abuts the internal shoulder 612.

FIG. 18b shows the position of the piston 650 relative to the expandable plunger 600 during a dispense. Because the extender 652 has a maximum height that is greater than that of upper side-wall 610, expandable plunger top 608 is elongated as the piston 650 is pushed into the chambers of expandable plunger 600 and the top of extender 652 pushes against the underside of expandable plunger top 608. When the base 651 of the piston 650 abuts the shoulder 612 of the expandable plunger 600, the expandable plunger 600 will be pushed towards the cartridge outlet. If the piston 650 is later withdrawn to the position shown in FIG. 18a, the elongated expandable plunger top 608 is allowed to return to its relaxed state. Accordingly, this action creates a low pressure in the cartridge, thereby drawing fluid product back into the capillary tube.

As previously mentioned, the shape of the extender 652 top is not necessarily rounded as shown in FIG. 18b. In alternate embodiments, extender 652 can include one or more smaller protrusions effective for elongating the expandable plunger top 608. As long as the maximum height of the extender 652, including any protrusion, is greater than the height of upper side-wall 610, any suitable shaped extender 652 can be used. The shape of base 651 is preferably sized to ensure that at least some or all of a surface of base 651 will abut the shoulder 612 in such a way that will ensure displacement of expandable plunger 600 within the cartridge.

Furthermore, the maximum height of the extender 652 can be selected based on the fluid product viscosity and the material used for the plunger. For example, low viscosity fluids may not require a plunger material with high resiliency, or an extender 652 having a significant height difference over the side-wall 610. A combination of material resiliency and extender height sufficient for drawing a single drop of fluid product back into the capillary tube when the piston 650 is withdrawn, can be determined by those skilled in the art.

Figure 19:
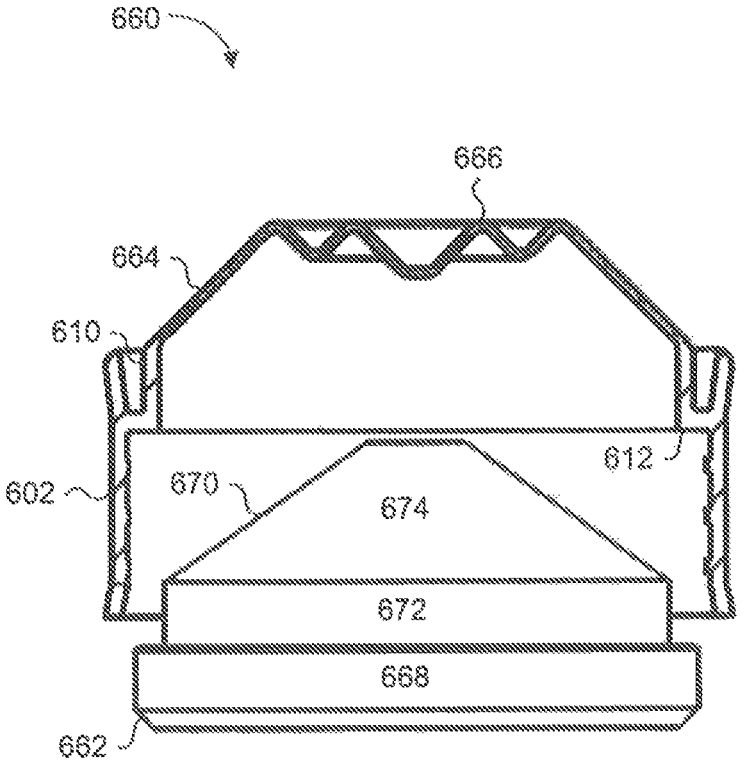
FIG. 19 is a cross-sectional view of an expandable plunger and piston according to another embodiment of the present invention; and, FIG. 20 is a flow chart of a method for operating the expandable plunger of FIG. 16, according to an embodiment of the present invention.

FIG. 19 is a cross-sectional view of an alternate expandable plunger 660 and a correspondingly shaped piston 662. Plunger 660 is similar in configuration to plunger 600, except that a frusto-conical side-wall 664 extends from upper side-wall 610 to the expandable plunger top 666. In the present embodiment, upper side-wall 610 and frusto-conical side-wall 664 form the secondary plunger chamber, and expandable plunger top 666 has a smaller area including folds of resilient material arranged in a corrugated configuration. The purpose for the smaller area of the expandable plunger top 666 is to maximize fluid evacuation where lesser drawback requirements exist. The piston 662 includes a base 668 similar to base 651 of FIG. 18a, and an extender 670 having a circular portion 672 and a frusto-conical portion 674. The diameter of circular portion 672 is sized to fit within upper side-wall 610. The shape of extender 670 is set to engage the underside of expandable plunger top 666 as the piston 662 is advanced by the drive rod, to stretch the expandable plunger top 666 before and edge of base 668 abuts the shoulder 612. As in the embodiment of FIGS. 18a and 18b, the stretched expandable plunger top 666 will return to its relaxed state when the piston 662 is withdrawn.

Figure 20:
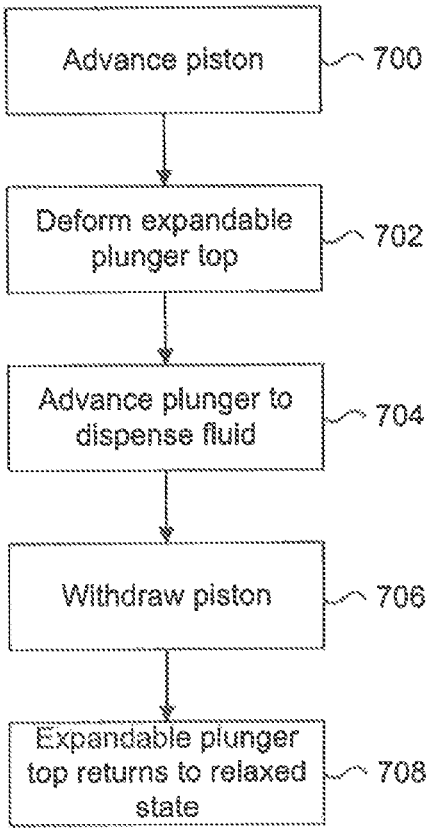

FIG. 20 is a method for operating the expandable plunger 600, according to an embodiment of the present invention. This method can be incorporated into step 508 of FIG. 15. It is assumed that the piston is shaped and sized for elongating the expandable plunger top 608, and is positioned as shown in FIG. 18a prior to the dispense operation. The method starts at step 700 by advancing the piston, typically under the control of a controller such as microprocessor 302 for example. As the piston advances, the top surface of the extender 652 will abut and push against the underside of expandable plunger top 608 to deform it at step 702. The expandable plunger top 608 will continue to deform until the base 651 abuts the shoulder 612 of the expandable plunger 600. Eventually, the base 651 will abut the shoulder 612 of the expandable plunger 600, thereby resulting in advancement of the plunger towards the outlet of the cartridge to dispense fluid product at step 704. The relative positions of the piston and the expandable plunger 600 will appear as in FIG. 18b. After the desired amount of fluid product is dispensed, the piston is withdrawn from the plunger at step 706, and the deformed expandable plunger top 608 will then return to its relaxed state at step 708. As the expandable plunger top 608 returns to its original relaxed state, a negative pressure is created in the cartridge to draw fluid in the capillary tube back into the cartridge. Therefore, any fluid that could result in a hanging fluid drop would be drawn back into the capillary tube.

The embodiments of the expandable plunger 600 and its method of use are applicable to the embodiments of the disposable fluid cartridge system previously shown. In such a system where spent cartridges are removed and replaced, a preset optional step would be to prime new cartridges before use. For example, when a new disposable cartridge is installed, the stepper motor can be actuated to drive the piston by a predetermined distance sufficient to clear the capillary tube of air pockets. It is noted that the piston does not need to be fully withdrawn from the chambers of the expandable plunger. In fact, the piston can be withdrawn to a position where the top portion of extender 652 is still in contact with the underside of expandable plunger top 608, or to a position where the expandable plunger top 608 is less expanded than in the fully expanded state. The less expanded state can be considered a relaxed state of the expandable plunger.

The previously described cartridge-based dispensing machine is thus simple to use and maintain by any person. Since the disposable cartridges are self-contained, there is no possibility of spillage when it is time to replace an empty cartridge with a full cartridge. Furthermore, the locking means for receiving and securing disposable cartridges allows for quick replacement of cartridges without any complex steps.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A pump unit for dispensing a predetermined volume of fluid comprising:

a stepper motor in threaded engagement with a threaded drive rod, the stepper motor rotatable in one direction by a number of steps to advance the threaded drive rod;

a cartridge mount coupled to the stepper motor, the cartridge mount having a locking means with an aperture sized to pass the threaded drive rod;

a disposable cartridge having a first end adapted to engage the locking means for securing the disposable cartridge to the cartridge mount, the disposable cartridge having a chamber sealed with a plunger slidable in the chamber, the disposable cartridge having an outlet nozzle at a second end for dispensing contents of the chamber when the plunger is pushed by the threaded drive rod, and the plunger including an expandable plunger top of resilient material deformable to an expanded state when the plunger is pushed by a piston connected to the threaded drive rod, the expandable plunger top returning to a relaxed state when the piston is withdrawn from the plunger by a predetermined distance.

2. The pump unit of claim 1, wherein the locking means includes a bayonet style twist lock, and the first end of the disposable cartridge is adapted for engaging the bayonet style twist lock.

3. The pump unit of claim 1, further including a capillary tube releasably connected to the outlet nozzle.

4. The pump unit of claim 1, further including a driver card in electrical communication with the stepper motor, the driver card including a microcontroller for controlling the stepper motor in response to pump control data.

5. The pump unit of claim 4, wherein the driver card includes a connector for receiving the pump control data.

6. The pump unit of claim 1, wherein the cartridge mount includes a mounting means for securing the cartridge mount to a chassis.

7. A dispensing machine for providing a predetermined volume of fluid corresponding to a user selection, comprising:

a pump unit having a stepper motor for advancing a threaded drive rod in response to pump control data;

a disposable cartridge releasably connected to the pump unit, and having a plunger for engaging the threaded drive rod, the disposable cartridge including a chamber sealed with the plunger, and the plunger having an expandable plunger top of resilient material deformable to an expanded state when the plunger is pushed by the threaded drive rod for dispensing the predetermined volume of fluid, the expandable plunger top returning to a relaxed state when the threaded drive rod is withdrawn from the plunger by a predetermined distance;

a user interface for providing electrical selection signals in response to the user selection; and a microprocessor for receiving the electrical selection signals and for providing the pump control data corresponding to the pump unit, the pump control data including stepper motor direction data and number of steps data.

8. The dispensing machine of claim 7, further including a capillary tube releasably connected to the outlet nozzle for directing the contents of the chamber to a dispensing area.

9. The dispensing machine of claim 7, wherein the pump unit includes a cartridge mount coupled to the stepper motor, the cartridge mount having a locking means with an aperture sized to pass the threaded drive rod and the disposable cartridge being adapted for engaging the locking means.

10. The dispensing machine of claim 9, wherein the pump unit includes a driver card in electrical communication with the stepper motor, the driver card including a controller for controlling the stepper motor in response to pump control data.

11. The dispensing machine of claim 10, wherein the pump unit includes an electromotive force detector for detecting a predetermined position of the threaded drive rod.

12. The dispensing machine of claim 10, wherein the cartridge mount includes a mounting means for securing the cartridge mount to the chassis.

13. The dispensing machine of claim 12, wherein the chassis includes a pump mount configured to releasably receive the mounting means of the cartridge mount.

14. The dispensing machine of claim 13, wherein the pump mount includes an interface card adapted for electrically engaging the driver card for passing the pump control data when the pump unit is secured to the pump mount.

15. A pump unit for dispensing a predetermined volume of fluid comprising:

a stepper motor in threaded engagement with a threaded drive rod, the stepper motor rotatable in one direction by a number of steps to advance the threaded drive rod;

a driver card in electrical communication with the stepper motor, the driver card including a microcontroller for controlling the stepper motor in response to pump control data;

a cartridge mount coupled to the stepper motor, the cartridge mount having a locking means with an aperture sized to pass the threaded drive rod;

a disposable cartridge having a first end adapted to engage the locking means for securing the disposable cartridge to the cartridge mount, the disposable cartridge having a chamber sealed with a plunger slidable in the chamber, the disposable cartridge having an outlet nozzle at a second end for dispensing contents of the chamber when the plunger is pushed by the threaded drive rod.

16. The pump unit of claim 15, wherein the plunger includes an expandable plunger top of resilient material deformable to an expanded state when the plunger is pushed by a piston connected to the threaded drive rod, the expandable plunger top returning to a relaxed state when the piston is withdrawn from the plunger by a predetermined distance.

17. The pump unit of claim 15, wherein the locking means includes a bayonet style twist lock, and the first end of the disposable cartridge is adapted for engaging the bayonet style twist lock.

18. The pump unit of claim 15, further including a capillary tube releasably connected to the outlet nozzle.

19. The pump unit of claim 15, wherein the driver card includes a connector for receiving the pump control data.

20. The pump unit of claim 15, wherein the cartridge mount includes a mounting means for securing the cartridge mount to a chassis.

21. A pump unit for dispensing a predetermined volume of fluid comprising:

a stepper motor in threaded engagement with a threaded drive rod, the stepper motor rotatable in one direction by a number of steps to advance the threaded drive rod;

a cartridge mount coupled to the stepper motor, the cartridge mount having a locking means with an aperture sized to pass the threaded drive rod and a mounting means for securing the cartridge mount to a chassis;

a disposable cartridge having a first end adapted to engage the locking means for securing the disposable cartridge to the cartridge mount, the disposable cartridge having a chamber sealed with a plunger slidable in the chamber, the disposable cartridge having an outlet nozzle at a second end for dispensing contents of the chamber when the plunger is pushed by the threaded drive rod.

22. The pump unit of claim 21, wherein the plunger includes an expandable plunger top of resilient material deformable to an expanded state when the plunger is pushed by a piston connected to the threaded drive rod, the expandable plunger top returning to a relaxed state when the piston is withdrawn from the plunger by a predetermined distance.

23. The pump unit of claim 21, wherein the locking means includes a bayonet style twist lock, and the first end of the disposable cartridge is adapted for engaging the bayonet style twist lock.

24. The pump unit of claim 21, further including a capillary tube releasably connected to the outlet nozzle.

25. The pump unit of claim 21, further including a driver card in electrical communication with the stepper motor, the driver card including a microcontroller for controlling the stepper motor in response to pump control data.

26. The pump unit of claim 25, wherein the driver card includes a connector for receiving the pump control data.

27. A dispensing machine for providing a predetermined volume of fluid corresponding to a user selection, comprising:

a pump unit having a stepper motor for advancing a threaded drive rod in response to pump control data, and a cartridge mount coupled to the stepper motor, the cartridge mount having a locking means with an aperture sized to pass the threaded drive rod and the disposable cartridge being adapted for engaging the locking means;

a disposable cartridge releasably connected to the pump unit, and having a plunger for engaging the threaded drive rod;

a user interface for providing electrical selection signals in response to the user selection; and a driver card in electrical communication with the stepper motor and including a microprocessor for receiving the electrical selection signals and for providing the pump control data corresponding to the pump unit, the pump control data including stepper motor direction data and number of steps data.

28. The dispensing machine of claim 27, wherein the disposable cartridge includes a chamber sealed with the plunger, the plunger having an expandable plunger top of resilient material deformable to an expanded state when the plunger is pushed by the threaded drive rod for dispensing the predetermined volume of fluid, the expandable plunger top returning to a relaxed state when the threaded drive rod is withdrawn from the plunger by a predetermined distance.

29. The dispensing machine of claim 28, further including a capillary tube releasably connected to the outlet nozzle for directing the contents of the chamber to a dispensing area.

30. The dispensing machine of claim 27, wherein the pump unit includes an electromotive force detector for detecting a predetermined position of the threaded drive rod.

31. The dispensing machine of claim 27, wherein the cartridge mount includes a mounting means for securing the cartridge mount to a chassis.

32. The dispensing machine of claim 31, wherein the chassis includes a pump mount configured to releasably receive the mounting means of the cartridge mount.

33. The dispensing machine of claim 32, wherein the pump mount includes an interface card adapted for electrically engaging the driver card for passing the pump control data when the pump unit is secured to the pump mount.

*34. A pump unit for dispensing a predetermined volume of fluid comprising:*

*a motor in threaded engagement with a threaded drive rod, the motor rotatable in one direction to advance the threaded drive rod;*

*a cartridge mount coupled to the motor, the cartridge mount having a locking means with an aperture sized to pass the threaded drive rod;*

*a cartridge having a first end adapted to engage the locking means for securing the cartridge to the cartridge mount, the cartridge having a chamber sealed with a plunger slidable in the chamber, the cartridge having an outlet nozzle at a second end for dispensing contents of the chamber when the plunger is pushed by the threaded drive rod, and the plunger including an expandable plunger top of resilient material deformable to an expanded state when the plunger is pushed by a piston connected to the threaded drive rod, the expandable plunger top returning to a relaxed state when the piston is withdrawn from the plunger by a predetermined distance.*

* * * * *